United States Patent
Zhu et al.

(10) Patent No.: US 12,018,966 B2
(45) Date of Patent: Jun. 25, 2024

(54) VIBRONIC MEASURING SYSTEM WITH TWO DRIVER CIRCUITS AND TWO MEASUREMENT TRANSMITTER CIRCUITS EACH IN COMMUNICATION WITH AN EXCITER AND A PAIR OF SENSORS

(71) Applicant: Endress+Hauser Flowtec AG, Reinach (CH)

(72) Inventors: Hao Zhu, Freising (DE); Reinhard Huber, Bad Säckingen (DE); Gerhard Eckert, Grenzach-Wyhlen (DE); Marco Oliver Scherrer, Muttenz (CH)

(73) Assignee: Endress+Hauser Flowtec AG, Reinach (CH)

( * ) Notice: Subject to any disclaimer, the term of this patent is extended or adjusted under 35 U.S.C. 154(b) by 386 days.

(21) Appl. No.: 17/416,067

(22) PCT Filed: Nov. 21, 2019

(86) PCT No.: PCT/EP2019/082044
§ 371 (c)(1),
(2) Date: Jun. 18, 2021

(87) PCT Pub. No.: WO2020/126285
PCT Pub. Date: Jun. 25, 2020

(65) Prior Publication Data
US 2022/0074777 A1    Mar. 10, 2022

(30) Foreign Application Priority Data
Dec. 21, 2018    (DE) ...................... 10 2018 133 318.8

(51) Int. Cl.
*G01F 1/84* (2006.01)
*G01F 15/02* (2006.01)
(Continued)

(52) U.S. Cl.
CPC .......... *G01F 1/8431* (2013.01); *G01F 1/8436* (2013.01); *G01F 1/8477* (2013.01);
(Continued)

(58) Field of Classification Search
CPC .... G01F 1/8431; G01F 1/8436; G01F 1/8477; G01F 15/024; G01F 15/10; G01F 15/14
(Continued)

(56) References Cited

U.S. PATENT DOCUMENTS

2011/0167907 A1    7/2011  Bitto et al.
2012/0073384 A1*   3/2012  Rieder .................. G01F 1/8418
                                              73/861.355
(Continued)

FOREIGN PATENT DOCUMENTS

CN    101484862 A    7/2009
CN    102187185 A    9/2011
(Continued)

*Primary Examiner* — Nathaniel T Woodward
(74) *Attorney, Agent, or Firm* — Mark A. Logan; Endress+Hauser (USA) Holding, Inc.

(57)    ABSTRACT

The flow measuring system comprises a measuring transducer having a tube arrangement to convey a flowing fluid, an exciter arrangement for forced mechanical oscillations of the tube arrangement, and a sensor arrangement for registering mechanical oscillations of the tube arrangement. The measuring system further comprises a measuring and operating electronics electrically coupled with the exciter arrangement and the sensor arrangement. The measuring system has two driver circuits and two measurement transmitter circuits. The tube arrangement includes two flow dividers and four connected tubes adapted to be flowed through by the measured substance. The exciter arrangement includes two oscillation exciters, and the sensor arrangement includes four oscillation sensors. The first measurement transmitter circuit processes measurement signals from two oscillation sensors and outputs such to the second measure-
(Continued)

ment transmitter circuit The second measurement transmitter circuit processes oscillation measurement signals of the other two oscillation sensors and ascertains total flow measured values.

25 Claims, 7 Drawing Sheets

(51) Int. Cl.
  *G01F 15/10* (2006.01)
  *G01F 15/14* (2006.01)
(52) U.S. Cl.
  CPC ............ *G01F 15/024* (2013.01); *G01F 15/10* (2013.01); *G01F 15/14* (2013.01)
(58) Field of Classification Search
  USPC ..................................................... 73/861.356
  See application file for complete search history.

(56) References Cited

U.S. PATENT DOCUMENTS

2017/0356777 A1  12/2017  Zhu et al.
2018/0087946 A1  3/2018  Rolph et al.

FOREIGN PATENT DOCUMENTS

| | | |
|---|---|---|
| CN | 102348962 A | 2/2012 |
| CN | 102667421 A | 9/2012 |
| CN | 103180695 A | 6/2013 |
| CN | 105043478 A | 11/2015 |
| CN | 107209039 A | 9/2017 |
| DE | 102006030962 A1 | 1/2008 |
| DE | 102009055069 A1 | 6/2011 |
| DE | 102014118367 A1 | 6/2016 |
| DE | 102015104931 A1 | 6/2016 |
| DE | 102017106209 A1 | 7/2018 |
| WO | WO-2010103075 A1 * | 9/2010 ........... G01F 1/8409 |
| WO | 2012028245 A1 | 3/2012 |

* cited by examiner

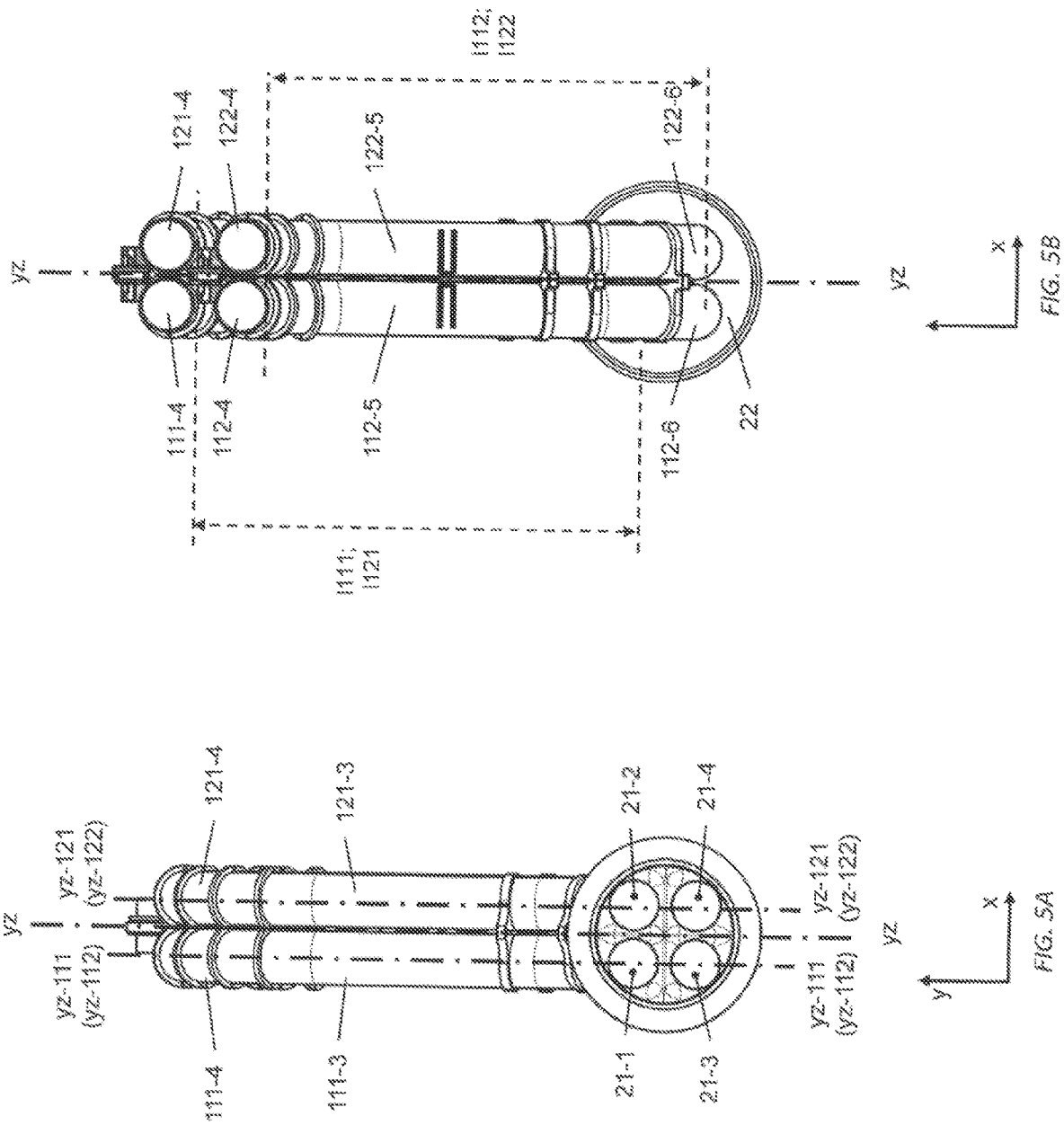

VIBRONIC MEASURING SYSTEM WITH TWO DRIVER CIRCUITS AND TWO MEASUREMENT TRANSMITTER CIRCUITS EACH IN COMMUNICATION WITH AN EXCITER AND A PAIR OF SENSORS

CROSS-REFERENCE TO RELATED APPLICATIONS

The present application is related to and claims the priority benefit of German Patent Application No. 10 2018 133 318.8, filed on Dec. 21, 2018 and International Patent Application No. PCT/EP2019/082044, filed on Nov. 21, 2019, the entire contents of which are incorporated herein by reference.

TECHNICAL FIELD

The invention relates to a vibronic measuring system, especially one embodied as a Coriolis-mass flow-measuring device, or Coriolis-mass flow-/density-measuring device.

BACKGROUND

A measuring system of the field of the invention is described, for example, in US-A 2017/0356777. Such includes a measuring transducer having a tube arrangement to convey the flowing fluid, an exciter arrangement for converting electrical power into mechanical power serving for exciting and maintaining forced mechanical oscillations of the tube arrangement, and a sensor arrangement for registering mechanical oscillations of the tube arrangement and for providing oscillation measurement signals representing, in each case, oscillatory movements of the tube arrangement, as well as a measuring- and operating electronics electrically coupled with the measuring transducer, namely both with its exciter arrangement as well as also with its sensor arrangement, wherein the measuring- and operating electronics has first and second driver circuits for providing electrical power to the exciter arrangement and a measurement transmitter circuit for processing oscillation measurement signals of the sensor arrangement and for activating the driver circuit.

The tube arrangement includes an inlet side, first flow divider serving for line branching and having exactly four flow openings, an outlet-side, second flow divider embodied equally to the first flow divider but, in this case, serving as a line junction, and having exactly four flow openings, as well as four, in each case, sectionally bent, only pairwise equally constructed, tubes, namely a first tube, a second tube constructed equally to the first tube, a third tube as well as a fourth tube constructed equally only to the third tube. Each of the tubes of the tube arrangement extends with a tube length, in each case, from a first end of the tube to a second end of the tube and includes, in each case, a lumen surrounded by a metal tube wall, and extending, in each case, from the first end of the tube to the second end of the tube. Additionally, each of the tubes of the tube arrangement is, in each case, connected to each of the first and second flow dividers, in such a manner that the first tube communicates with its first end with a first flow opening of the first flow divider and with its second end with a first flow opening of the second flow divider, the second tube communicates with its first end with a second flow opening of the first flow divider and with its second end with a second flow opening of the second flow divider, the third tube communicates with its first end with a third flow opening of the first flow divider and with its second end with a third flow opening of the second flow divider and the fourth tube communicates with its first end with a fourth flow opening of the first flow divider and with its second end with a fourth flow opening of the second flow divider. Moreover, each of the tubes of the tube arrangement is, in each case, also adapted to be flowed through by measured substance and during that to be caused to vibrate.

The exciter arrangement includes two electrodynamic oscillation exciters, of which a first oscillation exciter is connected mechanically with both the first tube as well as also the second tube as well as electrically with the first driver circuit and a second oscillation exciter is connected mechanically with both with the third tube as well as also the fourth tube as well as electrically with the second driver circuit. Each of the first and second oscillation exciters is, additionally, in each case, adapted to convert electrical into mechanical power. The first driver circuit is, in turn, adapted to generate an electrical, first driver signal and therewith to supply electrical power only to the first oscillation exciter, in such a manner that the first and second tubes execute, at least partially, wanted oscillations, namely opposite-equal, forced mechanical oscillations having at least a first wanted frequency, namely an oscillation frequency predetermined by the first driver signal and corresponding to a first resonant frequency of the tube arrangement, oscillations which are suitable to bring about in the measured substance flowing through the first and second tubes, in each case, Coriolis forces dependent on the mass flow, while the second driver circuit is adapted to generate an electrical, second driver signal and therewith to supply electrical power only to the second oscillation exciter, in such a manner that the third and fourth tubes execute, at least partially, wanted oscillations, namely opposite-equal, forced mechanical oscillations having at least a second wanted frequency, namely an oscillation frequency predetermined by the second driver signal and corresponding to a second resonant frequency of the tube arrangement, oscillations which are suitable to bring about in the measured substance flowing through the third and fourth tubes, in each case, Coriolis forces dependent on the mass flow.

For registering oscillations of the tube arrangement, the sensor arrangement includes, spaced from one another, four electrodynamic oscillation sensors, of which a first oscillation sensor and a second oscillation sensor are, in each case, mechanically connected with both the first tube as well as also the second tube as well as electrically connected, in each case, with the measurement transmitter circuit and a third oscillation sensor and a fourth oscillation sensor are, in each case, mechanically connected with both the third tube as well as also the fourth tube as well as, in each case, likewise electrically connected with the measurement transmitter circuit. Each of the oscillation sensors is, additionally, in each case, adapted to register oscillatory movements of the first, second, third, or fourth tubes connected mechanically therewith and to provide first, second, third, or fourth oscillation measurement signals representing the oscillatory movements.

The measurement transmitter circuit is, in turn, adapted to receive and to process both the first oscillation measurement signal of the first oscillation sensor as well as also the second oscillation measurement signal of the second oscillation sensor, namely to ascertain first portion-mass flow-measured values representing a mass flow of the measured substance flowing through the first and second tubes. Moreover, the measurement transmitter circuit is, furthermore, adapted to receive and to process both the third oscillation measurement signal of the third oscillation sensor as well as also the fourth oscillation measurement signal of the fourth oscillation sensor, namely to ascertain second portion-mass flow-measured values representing a mass flow of the measured substance flowing through the third and fourth tubes as well as based on the first and second portion-mass flow-measured values to ascertain total-flow-measured values representing a total-mass flow of the measured substance flowing through the first, second, third and fourth tubes.

In the above described measuring system, the oscillations must accordingly be evaluated with a special measurement transmitter circuit, namely a measurement transmitter circuit simultaneously processing all four oscillation measurement signals. This means, among other things, that the measurement transmitter circuit is, on the one hand, very complicated to develop and to manufacture, and, on the other hand, can with very high component complexity only be applied in very limited batches. As a result of this, such a measurement transmitter circuit, or the measuring- and operating electronics formed therewith, involves relatively high marginal costs. Moreover, the failure of only one of the four channels for the oscillation measurement signals leads to a total failure of the measuring- and operating electronics, or of the measuring system formed therewith, which can only be remedied by replacement of the total measurement transmitter circuit.

SUMMARY

Starting from the above described state of the art, an object of the invention is so to improve a vibronic measuring system that its measuring- and operating electronics enables, on the one hand, a separate exciting of oscillations of two pairs of tubes, as well as also a separate evaluation of two pairs of oscillation signals, and has, on the other hand, a simpler, more cost effective construction.

The object is achieved according to the invention by the measuring system as defined in the present disclosure, namely by a vibronic measuring system, such as e.g. a Coriolis-mass flow measuring device or a Coriolis-mass flow-/density-measuring device, for measuring and/or monitoring at least one flow parameter, for example, a flow parameter changeable as a function of time, for example, a mass flow, a volume flow and/or a flow velocity, and/or for measuring and/or monitoring at least one substance parameter, for example, a substance parameter changeable as a function of time, for example, a density and/or a viscosity, of a flowing measured substance, for example, a gas, a liquid or a dispersion, which measuring system comprises a measuring transducer having a tube arrangement to convey the flowing fluid, an exciter arrangement for converting electrical power into mechanical power serving for exciting and maintaining forced, mechanical oscillations of the tube arrangement and a sensor arrangement for registering mechanical oscillations of the tube arrangement and for providing, in each case, oscillation measurement signals representing oscillatory movements of the tube arrangement, and which measuring system further comprises a measuring- and operating electronics electrically coupled with the measuring transducer, namely both with its exciter arrangement as well as also with its sensor arrangement, for example, by means of electrical connection lines, and having a first driver circuit for providing electrical power to the exciter arrangement, a first measurement transmitter circuit for processing oscillation measurement signals of the sensor arrangement and for activating the first driver circuit, a second driver circuit for providing electrical power to the exciter arrangement, and a second measurement transmitter circuit for processing oscillation measurement signals of the sensor arrangement and for activating the second driver circuit.

The tube arrangement of the measuring system of the invention includes, especially, a first flow divider, especially a first flow divider serving as a line branching and/or an inlet side, first flow divider, having, especially exactly, four flow openings, a second flow divider, especially one embodied equally to the first flow divider and/or serving as a line junction and/or outlet-side, second flow divider, having, especially exactly, four flow openings, as well as four only pairwise equally constructed tubes, namely a first tube, especially an at least sectionally bent, first tube, a second tube constructed equally to the first tube, a third tube, especially an at least sectionally bent, third tube, as well as a fourth tube constructed equally only to the third tube. Each of the first, second, third and fourth tubes of the tube arrangement extends with a tube length, in each case, from a first end of the tube to a second end of the tube and includes, in each case, a lumen surrounded by a tube wall, especially a metal tube wall, and extending, in each case, from the first end of the tube to the second end of the tube. Moreover, each of the first, second, third and fourth tubes of the tube arrangement is, in each case, connected to each of the first and second flow dividers, in such a manner that the first tube communicates with its first end with a first flow opening of the first flow divider and with its second end with a first flow opening of the second flow divider, the second tube communicates with its first end with a second flow opening of the first flow divider and with its second end with a second flow opening of the second flow divider, the third tube communicates with its first end with a third flow opening of the first flow divider and with its second end with a third flow opening of the second flow divider and the fourth tube communicates with its first end with a fourth flow opening of the first flow divider and with its second end with a fourth flow opening of the second flow divider open, and each of the first, second, third and fourth tubes of the tube arrangement is, in each case, adapted to be flowed through by measured substance and during that to be caused to vibrate.

The exciter arrangement of the measuring system of the invention includes two, especially electrodynamic and/or equally constructed, oscillation exciters, of which a first oscillation exciter is connected mechanically with both the first tube as well as also the second tube as well as being connected electrically, especially only, with the first driver circuit and a second oscillation exciter is connected mechanically with both with the third tube as well as also the fourth tube as well as being connected electrically, especially only, with the second driver circuit, wherein each of the first and second oscillation exciters is, in each case, adapted to convert electrical power into mechanical power.

The first driver circuit is, in turn, adapted to generate an electrical, first driver signal and therewith to supply electrical power, especially only, to the first oscillation exciter, in such a manner that the first and second tubes execute, at least partially, wanted oscillations, namely opposite-equal, forced mechanical oscillations having at least a first wanted frequency, namely an oscillation frequency predetermined by the first driver signal and corresponding especially to a first resonant frequency of the tube arrangement, oscillations which are suitable to bring about in the measured substance flowing through the first and second tubes, in each case, Coriolis forces dependent on the mass flow, and the second driver circuit is adapted to generate an electrical, second driver signal and therewith to supply electrical power, especially only, to the second oscillation exciter, in such a manner that the third and fourth tubes execute, at least partially, wanted oscillations, namely opposite-equal, forced mechanical oscillations having at least a second wanted frequency, namely an oscillation frequency predetermined by the second driver signal and corresponding especially to a second resonant frequency of the tube arrangement, oscillations which are suitable to bring about in the measured substance flowing through the third and fourth tubes, in each case, Coriolis forces dependent on the mass flow.

The sensor arrangement includes four, especially electrodynamic and/or equally constructed and/or mutually spaced from one another, oscillation sensors, of which a first oscillation sensor and a second oscillation sensor are, in each case, mechanically connected with both the first tube as well as also the second tube as well as, in each case, especially only, electrically connected with the first measurement transmitter circuit and a third oscillation sensor and a fourth oscillation sensor are, in each case, mechanically connected with both the third tube as well as also the fourth tube as well as, in each case, especially only, electrically connected with the second measurement transmitter circuit. Each of the first, second, third and fourth oscillation sensors is, especially, in each case, adapted to register oscillatory movements of the first, second, third, or fourth tubes mechanically connected therewith and to provide first, second, third, or fourth, especially electrical, oscillation measurement signals representing the oscillatory movements.

The first measurement transmitter circuit is, in turn, adapted to receive and to process both the first oscillation measurement signal of the first oscillation sensor as well as also the second oscillation measurement signal of the second oscillation sensor, namely to ascertain an, especially digital, first portion-mass flow-measured values representing mass flow of the measured substance flowing through the first and second tubes and to output such to the second measurement transmitter circuit, and the second measurement transmitter circuit is adapted to receive and to process both the third oscillation measurement signal of the third oscillation sensor as well as also the fourth oscillation measurement signal of the fourth oscillation sensor, as well as also first portion-mass flow-measured values output by the first measurement transmitter circuit, namely to ascertain, especially digital, total-flow-measured values representing a total-mass flow of the measured substance flowing through the first, second, third and fourth tubes.

In a first embodiment of the invention, it is, furthermore, provided that the first driver circuit is connected, for example, via a data bus, electrically with the first measurement transmitter circuit, for example, however, not with the second measurement transmitter circuit.

In a second embodiment of the invention, it is, furthermore, provided that the second driver circuit is connected, for example, via a data bus, electrically with the second measurement transmitter circuit, for example, however, not with the first measurement transmitter circuit.

In a third embodiment of the invention, it is, furthermore, provided that the first measurement transmitter circuit and the second measurement transmitter circuit are electrically connected with one another, for example, via a data bus.

In a fourth embodiment of the invention, it is, furthermore, provided that the first measurement transmitter circuit is formed by means of a first microprocessor. Developing this embodiment, it is, furthermore, provided that the second measurement transmitter circuit is formed by means of a second microprocessor.

In a fifth embodiment of the invention, it is, furthermore, provided that the second measurement transmitter circuit is adapted using the third and fourth oscillation measurement signals to ascertain, for example, digital, second portion-mass flow-measured values representing a mass flow of the measured substance flowing through the third and fourth tubes. Developing this embodiment, it is, furthermore, provided that the second measurement transmitter circuit is adapted to ascertain total-flow-measured values using also second portion-mass flow-measured values.

In a sixth embodiment of the invention, it is, furthermore, provided that the sensor arrangement has at least two temperature sensors, especially temperature sensors constructed equally to and/or spaced from one another, of which a first temperature sensor is connected mechanically with one of the first, second, third and fourth tubes, especially with the first tube or with the second tube, as well as electrically, in each case, especially only, with the second measurement transmitter circuit, and a second temperature sensor is connected mechanically with one of the first, second, third and fourth tubes, especially the same tube as the first temperature sensor, as well as electrically, in each case, especially only, with the second measurement transmitter circuit, and each of the first and second temperature sensors is, in each case, adapted to register a temperature of the first, second, third, or fourth tube mechanically connected therewith and to provide a first, or second, especially electrical, temperature measurement signal representing temperature. Developing this embodiment of the invention, the second measurement transmitter circuit is, furthermore, adapted to receive and to process the first temperature measurement signal from the first temperature sensor, namely to ascertain, especially digital, first temperature-measured values representing the temperature registered with the first temperature sensor or a temperature dependent thereon. Additionally, the second measurement transmitter circuit can be adapted to receive and to process the second temperature measurement signal from the second temperature sensor, namely to ascertain, especially digital, second temperature-measured values representing the temperature registered with the second temperature sensor or a temperature dependent thereon, for example, in order to ascertain the total-mass flow-measured values also using the first and second temperature-measured values. Alternatively or supplementally, the second measurement transmitter circuit can also be adapted to output at least the first temperature-measured values, for example, the first and second temperature-measured values, to the first measurement transmitter circuit, and the first measurement transmitter circuit can then also be adapted to receive and to evaluate temperature-measured values output from the first measurement transmitter circuit, for example, to ascertain the first portion-mass flow-measured values and/or the first portion-density-measured values also using at least the first temperature-measured values.

In a seventh embodiment of the invention, it is, furthermore, provided that the first measurement transmitter circuit is adapted based at least on one of the first and second oscillation measurement signals to ascertain, especially digital, first portion-density-measured values representing a density of the measured substance flowing through the first and second tubes and to output such to the second measurement transmitter circuit. Developing this embodiment of the invention, the second measurement transmitter circuit is additionally adapted to receive first portion-density-measured values output from the first measurement transmitter circuit and based on first portion-density-measured values as well as at least one of the third and fourth oscillation measurement signals to ascertain, especially digital, total-density-measured values representing a density of the measured substance flowing through the first, second, third and fourth tubes.

In an eighth embodiment of the invention, the second measurement transmitter circuit is adapted based at least on one of the third and fourth oscillation measurement signals to ascertain, especially digital, second portion-density-measured values representing a density of the measured substance flowing through the third and fourth tubes. Developing this embodiment of the invention, the first measurement transmitter circuit is, furthermore, adapted, based at least on one of the first and second oscillation measurement signals, to ascertain, especially digital, first portion-density-measured values representing a density of the measured substance flowing through the first and second tubes and to output such to the second measurement transmitter circuit and the second measurement transmitter circuit is adapted to receive first portion-density-measured values output from the first measurement transmitter circuit and based on first and second portion-density-measured values to ascertain, especially digital, total-density-measured values representing an, especially average, density of the measured substance flowing through the first, second, third and fourth tubes.

In a first additional development of the invention the measuring system further comprises: a transducer housing jacketing the first, second, third and fourth tubes, wherein the transducer housing has at least one, especially hermetically sealed, cavity and wherein each of the first, second, third and fourth tubes is arranged within the cavity. Developing this embodiment of the invention, it is, furthermore, provided that the sensor arrangement has at least a third temperature sensor and the third temperature sensor is connected mechanically with the transducer housing as well as electrically, especially only, with the second measurement transmitter circuit and is adapted to register a temperature of the transducer housing and to provide a third temperature measurement signal, especially an electrical one, representing the temperature. Furthermore, the second measurement transmitter circuit can be adapted to receive and to process the third temperature measurement signal of the third temperature sensor, namely to ascertain, especially digital, third temperature-measured values representing the temperature registered with the third temperature sensor or a temperature dependent thereon, for example, in order to ascertain total-mass flow-measured values also using the third temperature-measured values. Alternatively or supplementally, the second measurement transmitter circuit can also be adapted to output the third temperature-measured values to the first measurement transmitter circuit, and the first measurement transmitter circuit can then be adapted to receive and to evaluate the third temperature-measured values, namely to ascertain the first mass flow-measured values also using the third temperature-measured values.

In a second additional development of the invention, the measuring system further comprises: an, especially explosion-, or pressure resistant, electronics-protective housing, wherein, for example, both the first and second driver circuits as well as also the first and second measurement transmitter circuits are accommodated in the electronics-protective housing, especially protected at least against water spray.

In a third additional development of the invention, the measuring- and operating electronics further comprises: an interface circuit, for example, an interface circuit accommodated together with the first and second driver circuits as well as the first and second measurement transmitter circuits in an electronics-protective housing of the measuring system, for outputting measured values, especially digital measured values and/or measured values ascertained by means of the second measurement transmitter circuit.

In a first embodiment of the third additional development of the invention, it is provided that the interface circuit is electrically connected with the second measurement transmitter circuit, for example, however, not with the first measurement transmitter circuit.

In a second embodiment of the third additional development of the invention, the second measurement transmitter circuit is adapted to output to the interface circuit total-flow-measured values ascertained therewith, and the interface circuit is adapted to receive total-mass flow-measured values output from the second measurement transmitter circuit and to convert them into a mass flow-output signal providing the total-mass flow-measured values and, for example, also conforming to an industrial standard.

BRIEF DESCRIPTION OF THE DRAWINGS

The invention as well as advantageous embodiments thereof will now be explained in greater detail based on examples of embodiments shown in the figures of the drawing. Equal, or equally acting or equally functioning parts are provided in all figures with equal reference characters; when perspicuity requires or it otherwise appears sensible, reference characters already shown in earlier figures are omitted in subsequent figures. Other advantageous embodiments or additional developments, especially also combinations of, firstly, only individually explained aspects of the invention, result, furthermore, from the figures of the drawing and/or from claims per se.

The figures of the drawing show as follows:

FIGS. 5A, 5B show in two additional side views, the tube arrangement of a measuring transducer of FIGS. 4A and 4B;

DETAILED DESCRIPTION

Figure 1:
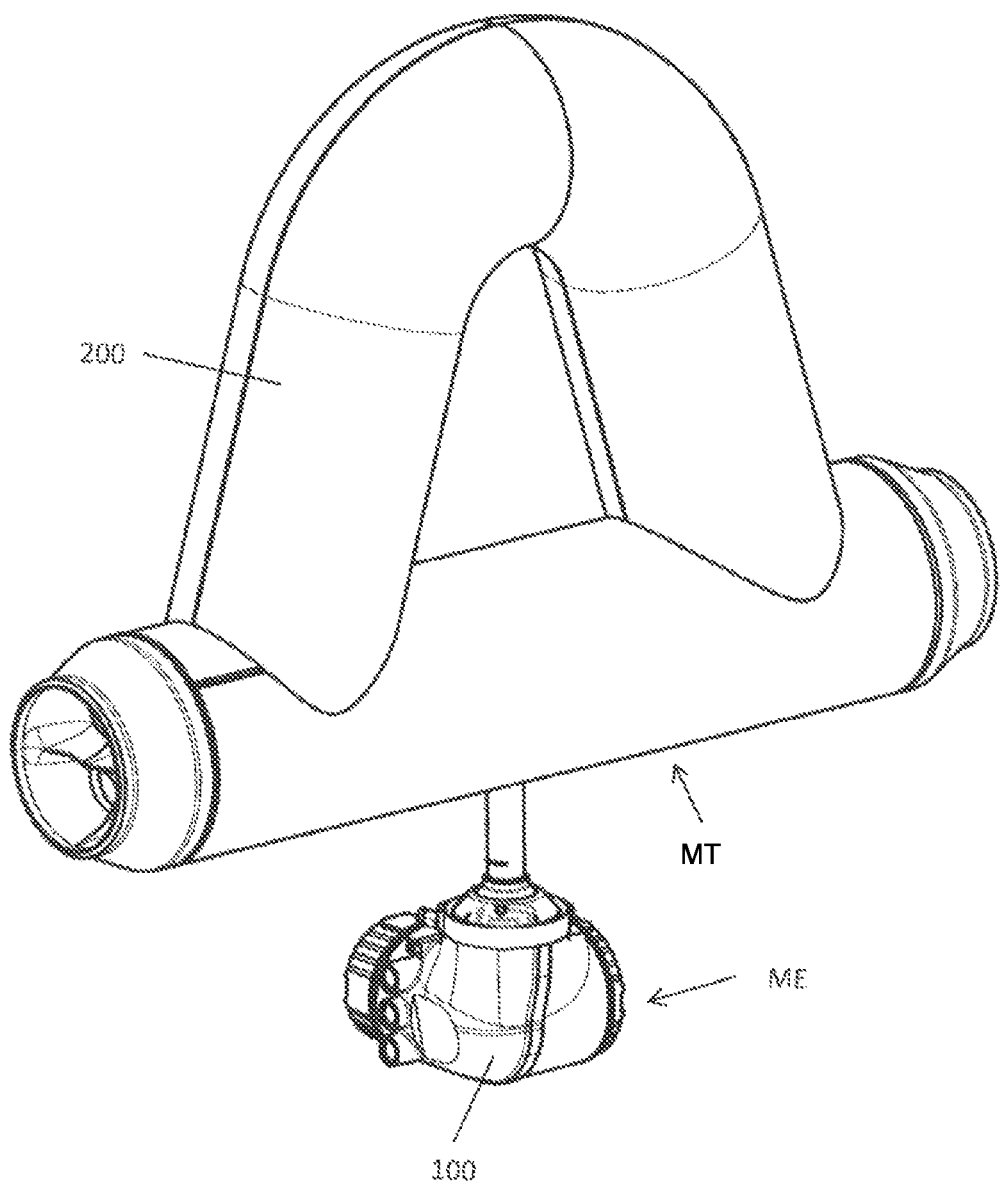
FIGS. 1, 2A, 2B show a vibronic measuring system in different, partially sectioned and/or perspective, side views.
Figure 2B:
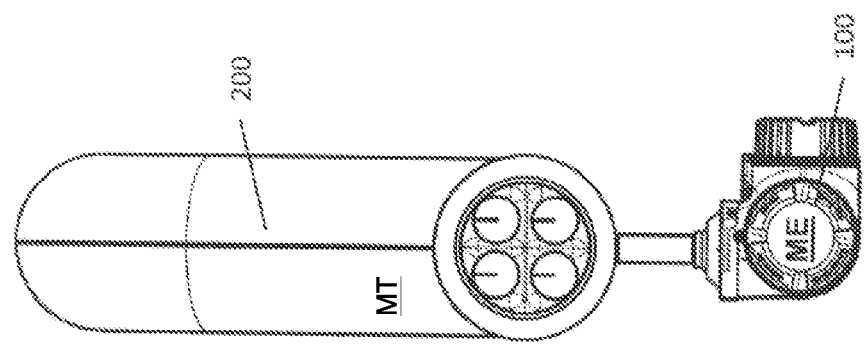
Figure 2A:
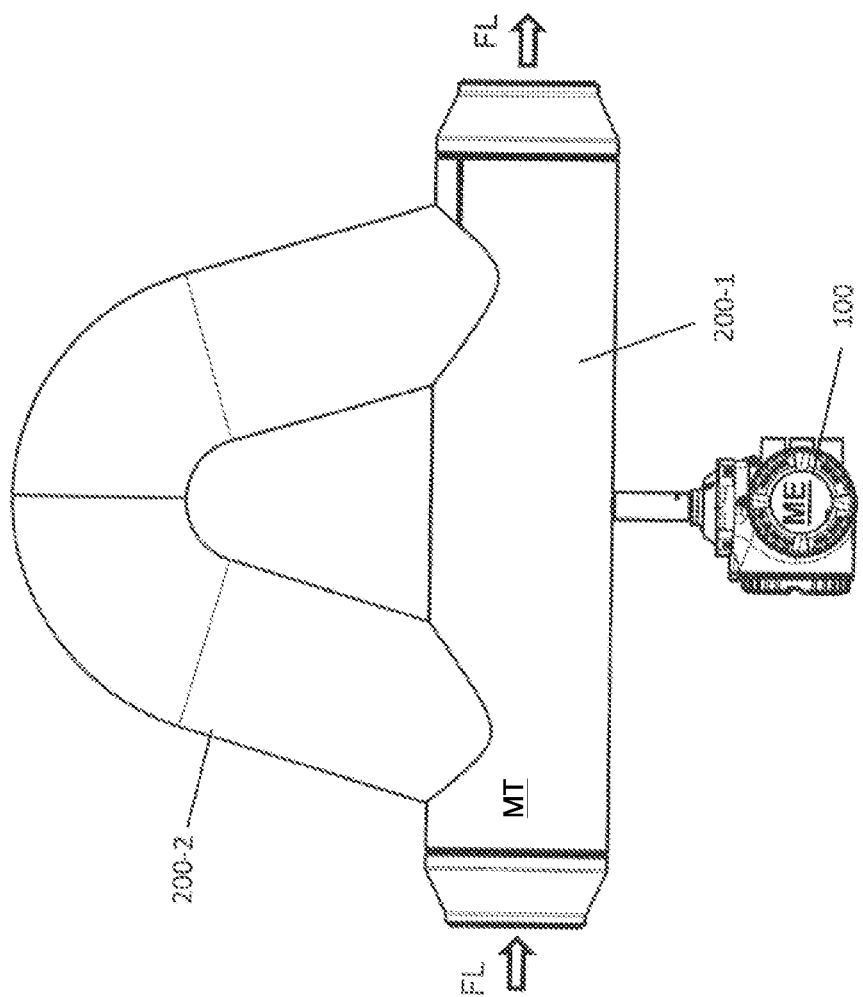

Shown schematically in FIGS. 1, 2A and 2B are examples of embodiments, or variants of embodiments for a vibronic measuring system serving for measuring and/or monitoring at least one flow parameter, especially a flow parameter changeable as a function of time, for example, a mass flow, a volume flow and/or a flow velocity, and/or for measuring and/or monitoring at least one substance parameter, especially a substance parameter changeable as a function of time, for example, a density and/or a viscosity, of a fluid FL flowing at least at times. The measuring system is, especially, provided, or adapted, to be incorporated into the course of a process line conveying the fluid FL, for example, a gas, a liquid or a dispersion, serving as a measured substance and/or a process line formed as a pipeline and during operation to be flowed through by fluid FL, at least at times, supplied and drained away by the process line.

Figures 3A, 3B:
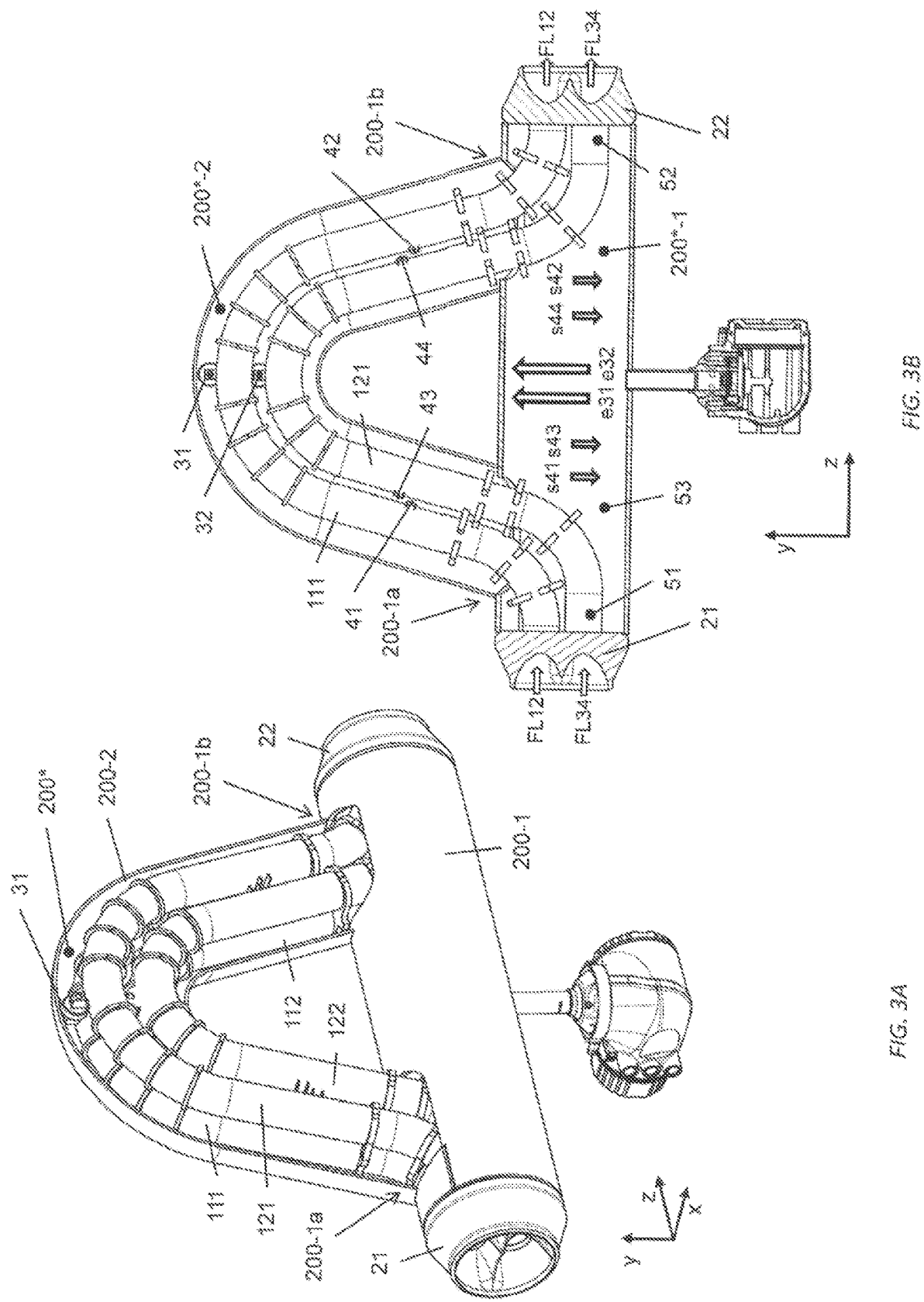
FIGS. 3A, 3B show in different, partially sectioned and/or perspective, side views, a measuring transducer suitable for a vibronic measuring system of FIG. 1, 2A, or 2B.

As shown in FIG. 3A, 3B, or directly evident from a combination of FIGS. 1, 2A, 2B, 3A and 3B, the measuring system comprises a measuring transducer MT having a tube arrangement formed by means of four only pairwise equally embodied tubes (111, 121, 112, 122), for example, tubes providing parallel flow paths with flow resistances deviating from one another, as well as two flow dividers (21, 22) connected to the tubes, an exciter arrangement (31, 32) for converting electrical power into mechanical power to exciting and maintaining forced, mechanical oscillations of the tubes, as well as a sensor arrangement (41, 42, 43, 44) for registering mechanical oscillations of the tube arrangement and for providing, in each case, oscillation measurement signals representing oscillatory movements of the tube arrangement, especially of their tubes. Additionally, provided in the measuring transducer can be, for example, also a temperature measuring arrangement serving for registering temperatures within the tube arrangement and/or a strain measuring arrangement serving for registering mechanical stresses within the tube arrangement.

The tube arrangement includes according to an additional embodiment of the invention a bent first tube 111, a bent second tube 121 constructed equally to the tube 111, a bent third tube 112 as well as a fourth tube 122 constructed equally only to the tube 112, consequently neither the tube 111 nor the tube 121. Moreover, the tube arrangement includes, such as shown in FIGS. 2A, 2B, 3A, 3B, 4A, 4B, 5A, and 5B, or directly evident from their combination, a first flow divider 21 with four flow openings 21-1, 21-2, 21-3, 21-4 and a second flow divider 22, for example, one embodied equally to flow divider 21, equally with four flow openings 22-1, 22-2, 22-3, 22-4. Each of the tubes 111, 112, 121, 122 extends, in each case, from a first end of the tube to a second end of the tube with a tube length and includes, in each case, a lumen surrounded by a tube wall, for example, a tube wall of metal, and extending, in each case, from the first end of the tube to the second end of the tube. Moreover, each of the tubes 111, 112, 121, 122 is, as well as also shown in FIGS. 3A and 3B, or directly evident from a combination of FIGS. 2A, 2B, 3A, 3B, 4A and 4B, in each case, connected to each of the two flow dividers 21, 22, for example, by material-bonding-, by force- and/or shape interlocking, in such a manner that the tube 111 communicates with its first end with a first flow opening 21-1 of the flow divider 21 and with its second end with a first flow opening 22-1 of the flow divider 22, the tube 121 communicates with its first end with a second flow opening 21-2 of the flow divider 21 and with its second end with a second flow opening 22-2 of the flow divider 22, the tube 112 communicates with its first end with a third flow opening 21-3 of the flow divider 21 and with its second end with a third flow opening 22-3 of the flow divider 22 and the tube 122 communicates with its first end with a fourth flow opening 21-4 of the flow divider 21 and with its second end with a fourth flow opening 22-4 of the flow divider 22. Additionally, each of the tubes 111, 112, 121, 122 of the tube arrangement is, in each case, adapted to be flowed through by measured substance and during that to be caused to vibrate. As evident from the combination of FIGS. 2A, 2B, 3A, 3B, 4A and 4B, the flow divider 21 can be arranged in the flow direction of the fluid FL at the inlet side and serve as a line branching and the flow divider 22 can correspondingly be arranged in the flow direction of the fluid FL at the outlet-side and serve as line junction. In an additional embodiment of the invention, it is, furthermore, provided that the tube arrangement has exactly four tubes, consequently besides the above described tubes 111, 112, 121, 122 no further tubes connected to the flow divider 21 and the flow divider 22. The above-mentioned tube length corresponds in this case to a straightened length, or the length of an imaginary center line of the tube, wherein the tube length of the tube 111 equals the tube length of the tube 121, and the tube length of the tube 121 equals the tube length of the tube 122. In an additional embodiment of the invention, the tube length of the tube 111 only equals the tube length of the tube 121, equally as well, is greater than the tube length of both the tube 121 as well as also the tube 122, and the tube length of the tube 121 only equals the tube length of the tube 122, equally as well, is less than the tube length of both the tube 111 as well as also the tube 112. The tube wall of each of the tubes 111, 121, 112, 122 of the tube arrangement has, in each case, a predetermined, for example, also essentially uniform, thickness and can, such as quite usual in the case of tube arrangements of the type being discussed, or measuring transducer, or measuring systems formed therewith, be, for example, of equal material and/or a metal, especially, in each case, a stainless steel or, in each case, a nickel based alloy. The tubes 111, 121, 112, 122 can, additionally, for example, in each case, be embodied as one piece, for example, seamlessly or at least in the case of a tube wall of metal have a welded seam, and/or, in each case, be formed by bending a tubular, semifinished piece, for example, in such a manner that each of the tubes 111, 121, 112, 122, as well as also indicated in FIGS. 2A, 2B, 3A and 3B, in each case, is essentially V shaped or has a V profile and/or that each of the tubes, as a result, has a tube form lying in a single (bending-)plane. In an additional embodiment of the invention, each of the tubes has, in each case, a caliber, namely an inner diameter, which amounts to not less than 20 mm, for example, also greater than 40 mm and/or the has the same caliber each of the other the tubes. Since the two tubes 111, 121, or the two tubes 121, 122, are of equal construction, the above-mentioned caliber of the tube 111 equals the caliber of the tube 121, or the caliber of the tube 121 equals the caliber of the tube 122. In an additional embodiment of the invention, the caliber of each of the tubes 111, 112, 121, 122 equals the caliber of each of the others of the tubes 111, 112, 121, and 122 and/or each of the tubes 111, 121, 112, 122 has, furthermore, in each case, a tube length to caliber-ratio, computed as a quotient of the tube length to the caliber, which is greater than 25 (25:1) for example, however, also less than 30(30:1). In an additional embodiment of the invention, the tube wall of each of the tubes has, in each case, a smallest thickness, which amounts to not less than 1 mm, for example, also greater than 1.5 mm and/or which equals the smallest thickness of the tube wall of each of the other tubes. Since the two tubes 111, 121, or the two tubes 121, 122 are of equal construction, the above-mentioned smallest thickness of the tube wall of the tube 111 equals the smallest thickness of the tube wall of the tube 121, or the smallest thickness of the tube wall of the tube 121 equals the smallest thickness of the tube wall of the tube 122. In an additional embodiment of the invention, the above-mentioned thickness of the tube wall of each of the tubes 111, 112, 121, 122 equals the smallest thickness of the tube wall of each of the others of the tubes 111, 112, 121, and 122. For connecting the tube arrangement, or the measuring transducer or measuring system formed therewith, with the above referenced process line conveying the fluid FL, the flow divider 21 can, additionally, have a first connecting flange, for example, a first connecting flange serving for connecting the tube arrangement to a line segment of the process supplying line the fluid FL during operation, and the flow divider 22 can have a second connecting flange, for example, a second connecting flange connecting the tube arrangement to a line segment of the process line serving for removing the fluid FL. Embodied on each of the above described connecting flanges can be, for example, in each case, a sealing surface for fluid tight, or leakage free, connecting of the tube arrangement with the corresponding line segment of the process line. Each of the two sealing surfaces can have a smallest diameter, which defines a nominal diameter of the measuring transducer and which amounts to more than 100 mm, and/or a smallest separation, which defines, in this case, an installed length of the tube arrangement, or of the measuring transducer formed therewith from the other the sealing surface and which amounts to greater more 1000 mm and/or less than 3000 mm.

Figure 4A:
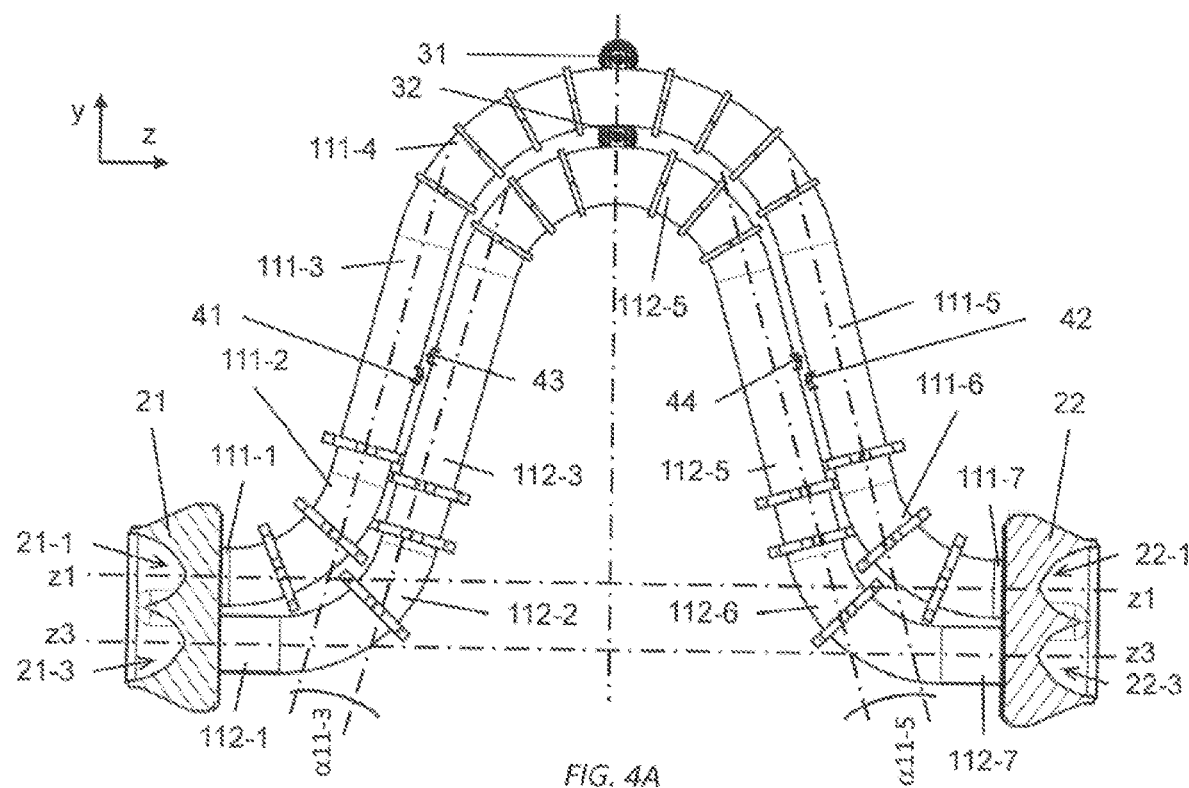
FIGS. 4A, 4B show in two side views, a tube arrangement of a measuring transducer of FIGS. 3A, 3B.
Figure 4B:
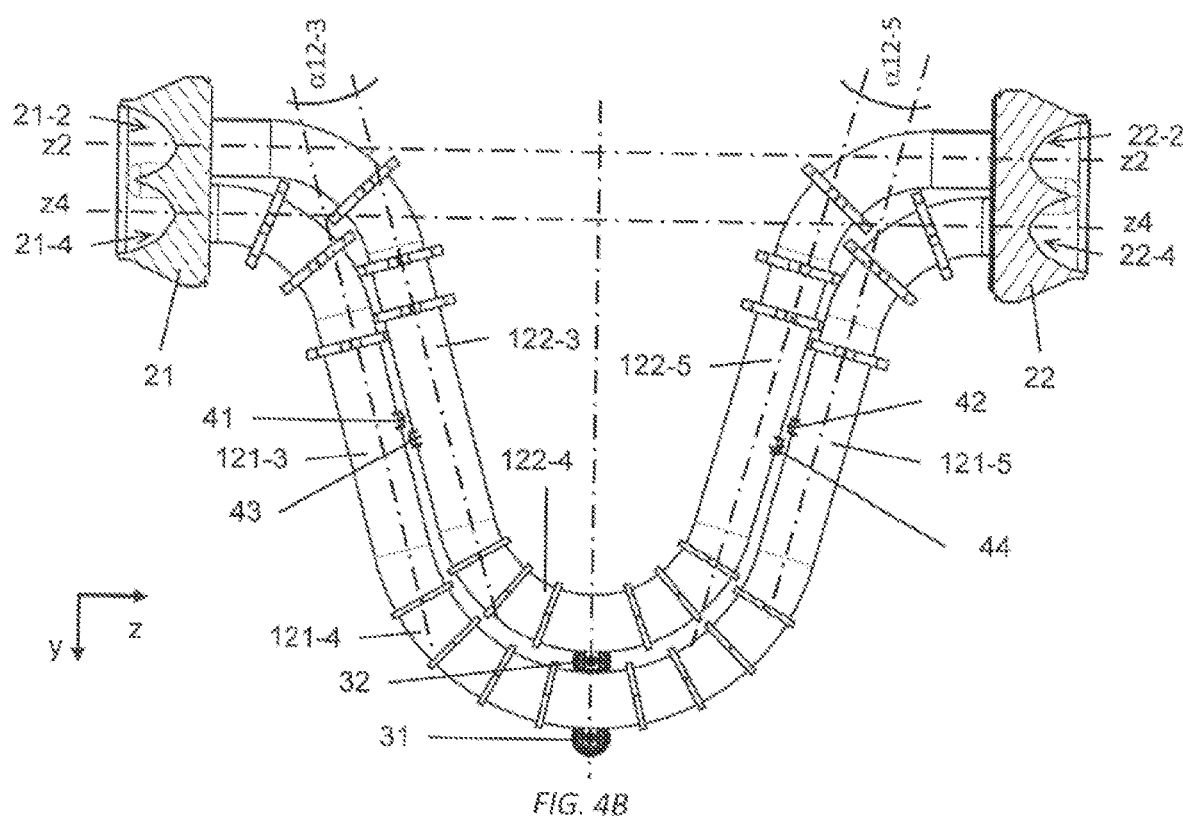

The tubes 111, 121, 112, 122 and the flow dividers 21, 22 are according to an additional embodiment of the invention, furthermore, so embodied and arranged that the tube arrangement has, as well as also shown schematically in FIGS. 4A and 4B, a first imaginary connecting axis z1, which connects a center of the flow opening 21-1 and a center of the flow opening 22-1 imaginarily with one another, a second imaginary connecting axis z2, which connects a center of the flow opening 21-2 and a center of the flow opening 22-2 imaginarily with one another, a third imaginary connecting axis z3, which connects a center of the flow opening 21-3 and a center of the flow opening 22-3 imaginarily with one another, as well as a fourth imaginary connecting axis z4, which connects a center of the flow opening 21-4 and a center of the flow opening 22-4 imaginarily with one another, in such a manner that each of the imaginary connecting axes z1, z2, z3, z4 extends, in each case, in parallel with each of the others of the connecting axes z1, z2, z3, z4. In an additional embodiment of the invention, as well as also directly evident from FIGS. 4A, 4B, 5A, and 5B—each of the tubes 111, 112, 121, 122 is so formed that it has, in each case, a first imaginary symmetry plane yz-111, yz-121, yz-112, yz-122 corresponding, for example, an imaginary longitudinal section plane therefor, as well as, perpendicular thereto, a second imaginary symmetry plane xy-111, xy-121, xy-112, xy-122 corresponding, for example, to an imaginary cross sectional plane therefor, and each of the tubes 111, 112, 121, 122 is, in each case, mirror symmetric both its associated first symmetry plane as well as also its associated second symmetry plane. The tubes 111, 121, 112, 122 and the flow dividers 21, 22 can, furthermore, be so embodied and arranged that both the imaginary symmetry plane yz-111 extends in parallel with the imaginary symmetry plane yz-121 as well as also the imaginary symmetry plane yz-112 extends in parallel with the imaginary symmetry plane yz-122 and/or that both the imaginary symmetry plane yz-111 is coincident with the imaginary symmetry plane yz-112 as well as also the imaginary symmetry plane yz-121 is coincident with the imaginary symmetry plane yz-122. In an additional embodiment, the tubes 111, 121, 112, 122 and the flow dividers 21, 22 are, furthermore, so embodied and arranged that the tube arrangement has, located both between the tube 111 and the tube 121 as well as also between the tube 112 and the tube 122, at least a first imaginary symmetry plane yz, relative to which the tube arrangement is, as well as also directly evident from FIG. 5A, mirror symmetric. The tube arrangement can, as well as also directly evident from FIGS. 4A, 4B, 5A and 5B, furthermore, be so embodied that its first symmetry plane yz is oriented, for example, in parallel with each of the above described symmetry planes yz-111, yz-121, yz-112, yz-122 of the tubes 111, 121, 112, 122 and/or arranged, in each case, with the same separation from each of the above described symmetry planes yz-111, yz-121, yz-112, yz-122 of the tubes 111, 121, 112, respectively 122; this, for example, also in such a manner that the two tubes 111, 121 are, in each case, parallel to one another, and to the imaginary symmetry plane yz of the tube arrangement and the two tubes 112, 122 are, in each case, parallel to one another, and to the imaginary symmetry plane yz of the tube arrangement and/or that the two tubes 111, 121 lie in a shared first tube plane lie and the tubes 121, 122 in a shared second tube plane. Accordingly, according to an additional embodiment of the invention, the tube 111 has from the imaginary symmetry plane yz of the tube arrangement a smallest separation, which equals a smallest separation, which the tube 112 has from the imaginary symmetry plane yz and/or the tube 121 has from the imaginary symmetry plane yz of the tube arrangement a smallest separation, which equals a smallest separation, which the tube 122 has from the imaginary symmetry plane yz. In an additional embodiment of the invention, it is, furthermore, provided that the tube arrangement has besides the above described, first imaginary symmetry plane yz a second imaginary symmetry plane xy perpendicular thereto, equally as well imaginarily intersecting each of the tubes and the tube arrangement is also mirror symmetric relative to this second imaginary symmetry plane xy.

Each of the tubes 111, 121, 112, 122 of the tube arrangement is, furthermore, in each case, adapted to convey fluid in its lumen, especially, in each case, a volumetric portion of the fluid FL to be measured, and during that to be caused to vibrate, for example, in each case, to execute forced mechanical oscillations, especially oscillations causing a measurable effect corresponding to the at least one measured variable and/or excited by means of the exciter arrangement, namely forced mechanical oscillations about, in each case, an associated static rest position; this, especially, in such a manner that each of the tubes of the tube arrangement is caused to vibrate and during that is flowed through by fluid beginning at its first end in proceeding in the direction of its second end. The forced mechanical oscillations can, such as quite usual in the case of measuring transducers of the type being discussed, be, at least partially, forced bending oscillations of the tubes about imaginary oscillation axes of the tube arrangement, namely, in each case, an oscillation axis imaginarily intersecting the tube; this, especially, also in such a manner that the (four) imaginary oscillation axes, for example, in the case of tubes located in static rest position, are essentially parallel to one another and/or to the above described, imaginary connecting axes z1, z2, z3, z4.

The exciter arrangement is especially provided and adapted to convert electrical power supplied it into mechanical power, in such a manner that the tube arrangement, especially each of its tubes, executes, at least at times, forced mechanical oscillations about a static rest position, while the sensor arrangement is provided and adapted to register mechanical oscillations of the tube arrangement, not least of all mechanical oscillations and/or bending oscillations of the tubes forced by means of the exciter arrangement, and to provide a first oscillation measurement signal s41, a second oscillation measurement signal s42, a third oscillation measurement signal s43 as well as a fourth oscillation measurement signal s44, of which, for example, electrical, oscillation measurement signals s41, s42, s43, s44 each represents, at least partially, oscillatory movements of one or more of the tubes 111, 121, 112, 122 of the tube arrangement, for example, in each case, by means of a variable electrical voltage corresponding to oscillatory movements of the tubes; this, especially, in such a manner that the first and second oscillation measurement signals s41, s42 are related to a change of a mass flow of the measured substance conveyed in the tube arrangement by a change of a first phase difference $4q12$, namely a change of a difference between a phase angle of the oscillation measurement signal s41 and a phase angle of the oscillation measurement signal s42 and the third and fourth oscillation measurement signals s43, s44 are related to a change of a mass flow of the measured substance conveyed in the tube arrangement by a change of a second phase difference $4q34$, namely a change of a difference between a phase angle of the oscillation measurement signal s43 and a phase angle of the oscillation measurement signal s44, and/or in such a manner that each of the above described oscillation measurement signals s41, s42, s43, s44 are related to a change of a density of the measured substance conveyed in the tube arrangement by a change of its signal frequency for at least one spectral signal component. For exciting and maintaining forced mechanical oscillations of the tubes, the exciter arrangement includes a, for example, electrodynamic, first oscillation exciter 31 as well as at least a, for example, electrodynamic and/or embodied equally to the first oscillation exciter 31, second oscillation exciter 32, wherein the oscillation exciter 31 is mechanically connected with each of the two tubes 111, 121 and the oscillation exciter 32 is mechanically connected with each of the two tubes 112, 122. Each of the two oscillation exciters 31, 32 is according to an embodiment of the invention, furthermore, provided, and adapted to convert electrical power supplied by the measuring- and operating electronics ME into mechanical power, especially into mechanical power effecting forced mechanical oscillations of the tubes 111, 121, or 112, 122 connected with their oscillation exciter 31, or 32, as the case may be; this, especially, in such a manner that the oscillation exciter 31 acts differentially on the two tubes 111, 121, namely can introduce, or introduces, only opposite-equal excitation forces into the two tubes 111, 121, and the oscillation exciter 32 acts differentially on the two tubes 112, 122, namely can introduce, or introduces, only opposite-equal excitation forces into the two tubes 112, 122.

For producing the above described oscillation measurement signals s41, s42, s43, s44, the sensor arrangement includes a, for example, electrodynamic, first oscillation sensor 41 for the oscillation measurement signal s41, a, for example, electrodynamic and/or embodied equally to the first oscillation sensor 41, second oscillation sensor 42 for the oscillation measurement signal s42, a, for example, electrodynamic and/or embodied equally to the first oscillation sensor 41, third oscillation sensor for the oscillation measurement signal s43, as well as at least a fourth oscillation sensor 44, for example, an electrodynamic fourth oscillation sensor 44 and/or one embodied equally to the third oscillation sensor 43, for the oscillation measurement signal s44. As also indicated in FIGS. 3A, 3B, 4A, and 4B, or directly evident from their combination, both the oscillation sensor 41 as well as also the oscillation sensor 42 are mechanically connected with each of the two tubes 111, 121 and both the oscillation sensor 43 as well as also the oscillation sensor 44 are mechanically connected with each of the two tubes 112, 122, for example, in such a manner that the oscillation sensor 41 and the the oscillation sensor 43 register, in each case, inlet side, oscillatory movements of the tubes 111, 121, 112, and 122, as the case may be, and the oscillation sensor 42 and the the oscillation sensor 44 register, in each case, outlet side oscillatory movements of the tubes 111, 121, 112, respectively 122. For example, the oscillation sensors can also be positioned in such a manner that the oscillation sensor 41 is spaced equally far from the flow divider 21 as the oscillation sensor 42 is from the flow divider 22 and/or that the oscillation sensor 43 is spaced equally far from the flow divider 21 as the oscillation sensor 44 is from the flow divider 22, and/or in such a manner that the two oscillation sensors 41, 42 are, in each case, positioned equally far from the oscillation exciter 31 and/or the two oscillation sensors 43, 44 are, in each case, positioned equally far from the oscillation exciter 32. In an additional embodiment of the invention, each of the oscillation sensors 41, 42 is, furthermore, provided, and adapted, to register opposed, in given cases, also opposite-equal, oscillatory movements of the tubes 111, 121 and to convert them into the oscillation measurement signals s41, s42 representing oscillatory movements and each of the oscillation sensors 43, 44 is, furthermore, provided, and adapted, to register opposed, in given cases, also opposite-equal, oscillatory movements of the tubes 112, 122 and to convert them into the oscillation measurement signals s43, s44 representing oscillatory movements; this, especially, in such a manner that each of the oscillation sensors 41, 42 differentially registers the oscillatory movements of the two tubes 111, 121, namely only converts opposed oscillatory movements of the tubes 111, 121 into its oscillation measurement signal, and each of the oscillation sensors 43, 44 differentially registers the oscillatory movements of the two tubes 112, 122, namely only converts opposed oscillatory movements of the tubes 112, 122 into its oscillation measurement signal. For lessening the number of required connection lines to the measuring- and operating electronics ME, the two oscillation sensors 41, 43 can be connected electrically in series, in such a manner that the two oscillation measurement signals s41, s43 superimpose on one another, and/or the two oscillation sensors 42, 44 can be connected electrically in series, in such a manner that the two oscillation measurement signals s42, s44 superimpose on one another.

In an additional embodiment of the invention, it is, furthermore, provided that, as well as also indicated in FIGS. 4A, 4B, 5A and 5B, each of the tubes 111, 112, 121, 122 of the tube arrangement has, in each case, at least one, straight, for example, hollow cylindrical, first segment 111-1, 121-1, 112-1, 122-1 connected with the flow divider 21, for example, by material-bonding- and/or by force- and/or shape interlocking, an arc shaped, for example, circular arc shaped, second segment 111-2, 121-2, 112-2, 122-2 following on the first segment 111-1, 121-1, 112-1, 122-1, a straight, for example, hollow cylindrical, third segment 111-3, 121-3, 112-3, 122-3 following on the second segment 111-2, 121-2, 112-2, 122-2, an arc shaped, for example, circular arc shaped, fourth segment 111-4, 121-4, 112-4, 122-4 following on the third segment 111-3, 121-3, 112-3, 122-3, a straight, for example, equally constructed to the similarly situated third segment 111-3, 121-3, 112-3, respectively 122-3 and/or hollow cylindrical, fifth segment 111-5, 121-5, 112-5, 122-5 following on the fourth segment 111-4, 121-4, 112-4, 122-4, an arc shaped, for example, equally constructed to the second segment 111-2, 121-2, 112-2, 122-2 and/or circular arc shaped, sixth segment 111-6, 121-6, 112-6, 122-6 following on the fifth segment 111-5, 121-5, 112-5, 122-5 as well as an arc shaped, for example, equally constructed to the first segment 111-1, 121-1, 112-1, 122-1 and/or hollow cylindrical, seventh segment 111-7, 121-7, 112-7, 122-7 both following on the sixth segment 111-6, 121-6, 112-6, 122-6 as well as also connected with the flow divider 22, for example, by material-bonding- and/or by force- and/or shape interlocking. For the above described case, in which the tube arrangement has both the symmetry plane yz as well as also the symmetry plane xy perpendicular thereto, it is according to an additional embodiment of the invention, furthermore, provided that the symmetry plane xy imaginarily intersects each of the tubes, in each case, in its fourth segment 111-4, 121-4, 112-4, 122-4. In an additional embodiment of the invention, each of the tubes has, as well as also indicated in FIG. 5B, or also directly evident from a combination of FIGS. 4A, 4B, 5A and 5B, in each case, a tube arc height h111, h121, h112, h122, measured within the above described symmetry plane xy as a smallest separation between the pertinent fourth segment 111-4, 121-4, 112-4, 122-4 and the associated axis z1, z2, z3 respectively. z4 imaginarily connecting the pertinent first and second ends, which tube arc height is, in each case, so selected that each of the tubes 111, 121, 112, 122 has, in each case, a tube length to tube arc height-ratio, which is computed as a quotient of the tube length of the tube to the tube arc height, and which is greater than 2 (2:1) for example, greater than 2.5 (2.5:1), and less than 4 (4:1) for example, less than 3 (3:1), and/or that each of the tubes 111, 121, 112, 122 has, in each case, a caliber to-tube arc height-ratio, computed as a quotient of the caliber of the tube to the tube arc height, which is greater than 0.1, for example, also less than 0.2. Furthermore, as well as also shown in FIGS. 4A and 4B, or evident from their combination, the oscillation sensor 41 can be placed at the segment 111-3 of the tube 111 spaced both from the segment 111-2 as well as also from the segment 111-4 as well as at the segment 121-3 of the tube 121 spaced both from the segment 121-2 as well as also from the segment 121-4, the oscillation sensor 42 can be placed at the segment 111-5 of the tube 111 spaced both from the segment 111-6 as well as also from the segment 111-4 as well as at the segment 121-5 of the tube 121 spaced both from the segment 121-6 as well as also from the segment 121-4, the oscillation sensor 43 can be placed at the segment 112-3 of the tube 112 spaced both from the segment 112-2 as well as also from the segment 112-4 as well as at the segment 122-3 of the tube 122 spaced both from the segment 122-2 as well as also from the segment 122-4, and the oscillation sensor 44 can be placed at the segment 112-5 of the tube 112 spaced both from the segment 112-6 as well as also from the segment 112-4 as well as at the segment 122-5 of the tube 122 spaced both from the segment 122-6 as well as also from the segment 122-4; this, for example, also in such a manner that the oscillation sensor 41 is positioned both partially between the segment 111-3 and the segment 112-3 as well as also partially between the segment 121-3 and the segment 122-3 and the oscillation sensor 42 is positioned both partially between the segment 111-5 and the segment 112-5 as well as also partially between the segment 121-5 and the segment 122-5 and/or that the oscillation sensor 43 is positioned both partially between the segment 111-3 and the segment 112-3 as well as also partially between the segment 121-3 and the segment 122-3 and the oscillation sensor 44 is positioned both partially between the segment 111-5 and the segment 112-5 as well as also partially between the segment 121-5 and the segment 122-5. Additionally, the oscillation sensors 41, 42 can be spaced both, in each case, equally far from the segment 111-4 as well as also, in each case, equally far from the segment 121-4 and/or the oscillation sensors 43, 44 can be spaced both, in each case, equally far from the segment 112-4 as well as also, in each case, equally far from the segment 122-4. Alternatively or supplementally, as well as also evident from FIGS. 4A and 4B, or their combination, the oscillation exciter 31 can be placed on the segment 111-4 of the tube 111 spaced both from the segment 111-3 as well as also from the segment 111-5 as well as at the segment 121-4 of the tube 121-4 spaced both from the segment 121-3 as well as also from the segment 121-5 and the oscillation exciter 32 can be placed at the segment 112-4 of the tube 112 spaced both from the segment 112-3 as well as also from the segment 112-5 as well as at the segment 122-4 of the tube 122 spaced both from the segment 122-3 as well as also from the segment 122-5; this, for example, also in such a manner that the oscillation exciter 31 is spaced equally far both from the segment 111-3 and the segment 111-5 of the tube 111 as well as also from the segment 121-3 and the segment 121-5 of the tube 121 and/or that the oscillation exciter 32 is spaced equally far both from the segment 112-3 and the segment 112-5 of the tube 112 as well as also from the segment 122-3 and the segment 122-5 of the tube 122. As shown in FIG. 4A, the two tubes 111, 112 can, furthermore, be so embodied and positioned that an imaginary longitudinal axis of the straight segment 111-3 of the tube 111 as well as an imaginary longitudinal axis of the straight segment 112-3 of the tube 112 form (at least in projection on the above-mentioned imaginary symmetry plane yz of the tube arrangement, in this case, also the plane of the drawing FIG. 4A), upon extension, a first angle of intersection $\alpha 11\text{-}3$ and an imaginary longitudinal axis of the straight segment 111-5 of the tube 111 as well as an imaginary longitudinal axis of the straight segment 112-5 of the tube 112 form (at least in projection on the above-mentioned imaginary symmetry plane yz of the tube arrangement), upon extension, a second angle of intersection $\alpha 11\text{-}5$. Equally, also the two other two tubes 121, 122 can be so embodied that, such as shown in FIG. 4B, an imaginary longitudinal axis of the segment 121-3 of the tube 121 as well as an imaginary longitudinal axis of the segment 122-3 of the tube 122 form (at least in projection on the above-mentioned imaginary symmetry plane yz of the tube arrangement, in this case, also the plane of the drawing FIG. 4B), upon extension, a second angle of intersection $\alpha 12\text{-}3$ and an imaginary longitudinal axis of the segment 121-5 of the tube 121 and an imaginary longitudinal axis of the segment 122-5 of the tube 122 form (at least in projection on the above-mentioned imaginary symmetry plane yz of the tube arrangement), upon extension, a fourth angle of intersection $\alpha 12\text{-}5$. Each of the above described angles of intersection $\alpha 11\text{-}3$, $\alpha 11\text{-}5$, $\alpha 12\text{-}3$, $\alpha 12\text{-}5$ is acute, namely greater than 0° and less than 90°. At least the two angles of intersection $\alpha 11\text{-}3$, $\alpha 11\text{-}5$ can, for example, also be equally large. Alternatively or supplementally, also the two angles of intersection $\alpha 12\text{-}3$, $\alpha 12\text{-}5$ can be equally large. In an additional embodiment of the invention, it is, furthermore, provided that each of the above described angles of intersection $\alpha 11\text{-}3$, $\alpha 11\text{-}5$, $\alpha 12\text{-}3$ and $\alpha 12\text{-}5$ is, in each case, greater than 0.1, for example, not less than 0.2°- and less than 10-, for example, not greater than 5-. As directly evident from a combination of FIGS. 4A, 4B, the tubes 111, 121, 112, 122 can, additionally, also be so embodied and arranged that a smallest separation $\Delta 11\text{-}4$ between the arc shaped segment 111-4 of the tube 111 and the arc shaped segment 112-4 of the tube 112 is both greater than a smallest separation $\Delta 11\text{-}3$ between the straight segment 111-3 of the tube 111 and the arc shaped segment 112-2 of the tube 112 as well as also greater than a smallest separation $\Delta 11\text{-}5$ between the straight segment 111-5 of the tube 111 and the arc shaped segment 112-6 of the tube 112 and equally also a smallest separation 412-4 between the arc shaped segment 121-4 of the tube 121 and the arc shaped segment 122-4 of the tube 122 is both greater than a smallest separation 412-3 between the straight segment 121-3 of the tube 121 and the arc shaped segment 122-2 of the tube 122 as well as also greater than a smallest separation 412-5 between the straight segment 121-5 of the tube 121 and the arc shaped segment 122-6 of the tube 122; this, for example, also in such a manner that the oscillation exciter 31 can be positioned both partially between the segment 111-4 of the tube 111 and the segment 112-4 as well as also partially between the segment 121-4 and the segment 122-4 and/or that the oscillation exciter 32 can, as well as also indicated, in each case, in FIG. 4A and in FIG. 4B, be positioned both partially between the segment 111-4 and the segment 112-4 as well as also partially between the segment-121-4 and the segment 122-4.

For protecting the tubes of the tube arrangement as well as further components of the measuring transducer applied thereto, not least of all the above described oscillation exciters 31, 32, and the oscillation sensors 41, 42, 43 44, against damaging environmental influences, for preventing undesired sound emissions from the vibrating tubes and even for accommodating fluid lost from a leaking tube arrangement, the measuring transducer further comprises, as well as also quite usual in the case of measuring transducers of the type being discussed, or measuring systems formed therewith, in an additional embodiment of the invention, a transducer housing 200 jacketing the tubes 111, 121, 112, 122 of the tube arrangement. The transducer housing 200 includes at least one cavity 200\*, for example, a hermetically sealed cavity 200\*, within which, as well as also evident from FIGS. 1, 2A, 2B, 3A and 3B, each of the tubes 111, 121, 112, 122 of the tube arrangement is arranged. The transducer housing can have, for example, a pressure resistance, which amounts to greater than a greatest pressure resistance of the tubes of the tube arrangement and/or more than 50 bar. In the case of the examples of embodiments illustrated in FIGS. 1, 2A, 2B, 3A, 3B, the transducer housing 200 comprises a support element 200-1 extending from a first end to a second end with a support element length, wherein the support element 200-1 is connected mechanically especially by material bonding, at its first end with the flow divider 21 and at its second end with the flow divider 22. Support element 200-1 includes at least one hollow space **200\*-1 surrounded by a wall, for example, a metal wall and forming a part of the cavity 200\* of the transducer housing 200 and can be embodied, for example, essentially cylindrically, in given cases, also at least sectionally hollow cylindrically, or tubularly. The wall of the support element 200-1 can be, for example, a steel, for example, a stainless steel or a structural steel, and/or of the same material as the walls of the tubes 111, 121, 112, 122. The support element can serve for, among other things, during operation of the measuring system to take up mechanical forces and/or moments introduced into the measuring transducer via a connected process line, especially in such a manner that of these forces and/or moments none or only very small portions, namely portions negligible for the desired accuracy of measurement of the measuring system, are transmitted to the tube arrangement arranged within the transducer housing. Besides the support element, the transducer housing 200 includes, in the case of the examples of embodiments shown here, furthermore, an envelope element 200-2, which is connected mechanically, for example, by material bonding, with the support element 200-1 of the transducer housing. Envelope element 200-2 can, as well as also evident from a combination of FIGS. 1, 2A, 3A and 3B, for example, be embodied tubularly, in such a manner that it has a hollow space 200\*-2, especially a partially circularly cylindrical hollow space, surrounded by a wall and forming a part of the cavity 200\*. Alternatively thereto, the envelope element 200-2 can, for example, also be cap shaped, in such a manner that a wall of the envelope element together with a segment of the wall of the support element form, or envelop, the hollow space 200\*-2. As also evident from FIGS. 3A, 3B, the transducer housing and the tube arrangement are, furthermore, so embodied that each of the tubes 111, 121, 112, 122 of the tube arrangement only partially within the hollow space 200\*-1 of the support element 200-1, and each of the tubes 111, 121, 112, 122 is arranged only partially within the hollow space 200\*-2 of the envelope element 200-2; this, such as directly evident from FIGS. 3A, 3B, for example, also in such a manner that each of the segments 111-4, 121-4, 112-4, 122-4 of the tubes is arranged exclusively within the hollow space 200\*-2 of the envelope element 200-2 and/or that each of the segments 111-3, 121-3, 112-3, 122-3, 111-5, 121-5, 112-5, 122-5 of the tubes is arranged at least predominantly within the hollow space 200\*-2 of the envelope element 200-2 and/or that each of the segments 111-2, 121-2, 112-2, 122-2, 111-6, 121-6, 112-6, 122-6 of the tubes is arranged at least predominantly outside of the hollow space 200\*-2 of the envelope element 200-2, and that, conversely, each of the second segments 111-2, 121-2, 112-2, 122-2, 111-6, 121-6, 112-6, 122-6 the tubes is arranged at least predominantly within the hollow space 200\*-1 of the support element 200-1 and/or that each of the segments 111-3, 121-3, 112-3, 122-3, 111-5, 121-5, 112-5, 122-5 of the tubes is arranged at least predominantly outside of the hollow space 200\*-1 of the support element 200-1. For lateral guiding of the tubes 111, 121, 112, 122 through the support element 200-1, its wall includes in an additional embodiment of the invention a first cavity 200-1***a* as well as at least one second cavity 200-1*b* spaced from the cavity 200-1*a* along an imaginary surface element of the wall. As directly evident from FIGS. 3A and 3B, each of the two cavities 200-1*a*, 200-1*b* forms, in each case, a part of the cavity 200\* of the transducer housing 200. Additionally, each of the tubes 111, 121, 112, 122 of the tube arrangement extends, in each case, both through the cavity 200-1*a* as well as also through the cavity 200-1*b*.

For the purpose of preventing measuring-damaging contacts of the vibrating tubes with one another or with the transducer housing, each of the tubes 111, 121, 112, 122 has only such separations from the other tubes, as well as also from the transducer housing 200, not least of all also from edges of each of the two cavities 200-1*a*, 200-1*b* in the wall of the support element 200-1, which, in each case, under all operating conditions, allow free oscillations with sufficient oscillation amplitude for measuring. In an embodiment of the invention, consequently, each of the tubes 111, 121, 112, 122 of the tube arrangement has, in each case, a smallest separation from the transducer housing 200 and/or a smallest separation from each of the others of the tubes 111, 121, 112, 122, which is greater than 5 mm. Accordingly, each of the tubes also has, in each case, a smallest separation from an edge of the cavity 200-1*a*, and, in each case, a smallest separation from an edge of the cavity 200-1*b*, which is greater than 5 mm. In order, on the other hand, also to be able to provide an as compact as possible measuring transducer, it is provided according to an additional embodiment that one or more, in given cases, also each, of the above described smallest separations is kept less than 10 mm. In an additional embodiment of the invention, it is, furthermore, provided that, both within the cavity 200-1a as well as also within the cavity 200-1b, a smallest separation between the tube 111 and the tube 112 is, in each case, less than the above-mentioned smallest separation between the segment 111-4 of the tube 111 and the segment 112-4 of the tube 112, and that both within the cavity 200-1a as well as also within the cavity 200-1b a smallest separation between the tube 121 and the tube 122 is, in each case, less than the above-mentioned smallest separation between the fourth segment 121-4 of the tube 121 and the segment 122-4 of the fourth tube 122.

Besides the measuring transducer MT, the measuring system comprises, furthermore, a measuring- and operating electronics ME electrically coupled therewith, namely electrically coupled both to the above described exciter arrangement of the measuring transducer as well as also to the above described sensor arrangement of the measuring transducer, for example, by means of corresponding electrical connection lines. The measuring- and operating electronics ME of the measuring system of the invention includes two, for example, equally constructed, driver circuits (Exc1, Exc2) for providing electrical power to the exciter arrangement, of which a first driver circuit Exc1 is adapted to generate an electrical, first driver signal e31 and therewith to supply electrical power, for example, only, or exclusively, to the oscillation exciter 31, in such a manner that the first and second tubes 111, 112 execute, at least partially, wanted oscillations, namely opposite-equal, forced mechanical oscillations having at least a first wanted frequency $f_{N1}$, namely an oscillation frequency predetermined by the driver signal e31 and suitable to bring about in the measured substance flowing, in each case, through the tubes 111, 112 Coriolis forces dependent on the mass flow, and of which a second driver circuit Exc2 is adapted to generate an electrical, second driver signal e32 and therewith to supply electrical power, for example, only, or exclusively, to the oscillation exciter 32, in such a manner that the third and fourth tubes 121, 122 execute, at least partially, wanted oscillations, namely opposite-equal, forced mechanical oscillations having at least a second wanted frequency $f_{N2}$, namely an oscillation frequency predetermined by the driver signal e32 and suitable to bring about in the measured substance flowing, in each case, through the third and fourth tubes Coriolis forces dependent on the mass flow The above-mentioned first wanted frequency $f_{N1}$ can, for example, correspond to a first resonant frequency of the tube arrangement dependent on the density of the fluid FL conveyed in the tube arrangement, for example, to a lowest common resonant frequency of a first tube pair formed by means of the tubes 111, 121, and the above-mentioned second wanted frequency $f_{N2}$ can correspond, for example, to a second resonant frequency of the tube arrangement dependent on the density of the fluid FL conveyed in the tube arrangement and, in given cases, also differing from the first resonant frequency, for example, a lowest common resonant frequency of a second tube pair formed by means of the tubes 112, 122. In an additional embodiment of the invention, it is, furthermore, provided that the oscillation exciter 31 is connected electrically only, or exclusively, with the driver circuit Exc1 and the oscillation exciter 32 is connected electrically only, or exclusively, with the driver circuit Exc2, consequently it is provided that during operation the driver circuit Exc1 feeds no electrical power to oscillation exciter 32 and the driver circuit Exc2 feeds no electrical power to oscillation exciter 31.

Furthermore, the measuring- and operating electronics is also provided, and adapted, to receive and to evaluate the above described oscillation measurement signals s41, s42, s43, s44, for example, based on the above referenced first phase difference $\Delta\varphi12$ and/or based on the above referenced second phase difference $\Delta\varphi34$, to generate (total-)mass flow-measured values $(X_m)$ representing the mass flow of the measured substance FL and/or based at least on one signal frequency of at least one of the oscillation measurement signals s41, s42, s43, s44, for example, based on a signal frequency corresponding to the above described, first wanted frequency for at least one of the oscillation measurement signals s41, s42 and/or based on a signal frequency corresponding to the above described, second wanted frequency for at least one of the oscillation measurement signals s43, s44, to generate (total-)density-measured values $(X_\rho)$ representing the density of the fluid FL. Alternatively or supplementally, the measuring- and operating electronics can also be provided, or adapted, based at least on one of the oscillation measurement signals s41, s42, s43, s44, and/or at least one of the above described driver signals e31, e32, to generate (total-)viscosity-measured values $(X_\eta)$ representing the viscosity of the measured substance FL.

Figure 6:
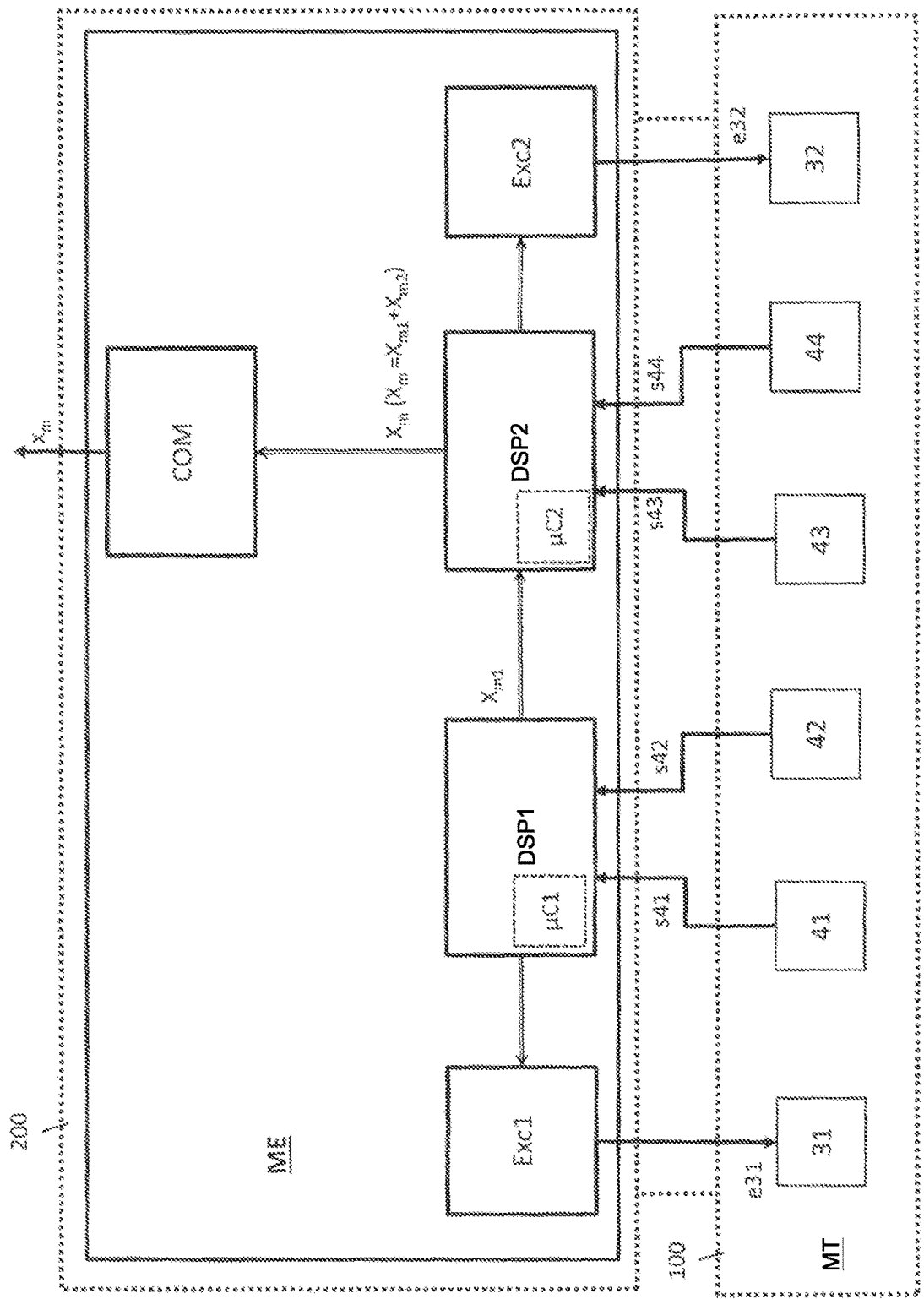
FIG. 6 shows schematically in the manner of a block diagram, a measuring- and operating electronics suitable for a vibronic measuring system of FIG. 1, 2A, or 2B.

For processing oscillation measurement signals of the sensor arrangement and for activating the driver circuits, the measuring- and operating electronics ME of the measuring system of the invention includes, as well as also schematically shown in FIG. 6, a first measurement transmitter circuit DSP1 as well as at least a second measurement transmitter circuit DSP2, where the measurement transmitter circuit DSP1 is adapted to receive and to process both the oscillation measurement signal s41 of the oscillation sensor 41 as well as also the oscillation measurement signal s42 of the oscillation sensor 42, namely to ascertain, especially digital, first portion-mass flow-measured values $X_{m1}$ representing a mass flow, m1, of the measured substance (FL12) flowing through the first and second tubes 111, 112 and to output such to the measurement transmitter circuit DSP2, and wherein the measurement transmitter circuit DSP2 is adapted to receive and to process both the oscillation measurement signal s43 of the oscillation sensor 43 as well as also the oscillation measurement signal s44 of the oscillation sensor 44, as well as also first portion-mass flow-measured values $X_{m1}$ output from the measurement transmitter circuit DSP1, namely to ascertain, especially digital, total-flow-measured values $X_m$ representing a total-mass flow m of the measured substance FL flowing through the first, second, third and fourth tubes 111, 112, 121, 122. Accordingly, the measurement transmitter circuit DSP1 can, especially, also be adapted to ascertain the above-mentioned phase difference $\Delta\varphi12$ between the oscillation measurement signal s41, s42 and based thereon to calculate the first portion-mass flow-measured values $X_{m1}$ and the measurement transmitter circuit DSP2 can, especially, also be adapted to ascertain the above-mentioned phase difference $\Delta\varphi34$ between the oscillation measurement signal s43, s44 and to include such in the calculating of the total-mass flow-measured values $X_m$.

In an additional embodiment of the invention, it is, furthermore, provided that both the oscillation sensor 41 as well as also the oscillation sensor 42 are connected electrically, in each case, only, or exclusively, to the measurement transmitter circuit DSP1 and both the oscillation sensor 43 as well as also the oscillation sensor 44 are connected electrically, in each case, only, or exclusively, to the measurement transmitter circuit DSP2. In an additional embodiment of the invention, the measurement transmitter circuit DSP1 is adapted both to process the oscillation measurement signals s41, s42 as well as also to activate the driver circuit Exc1, for example, based on the first and/or second oscillation measurement signals to calculate desired values for generating the driver signal e31 and to transmit such to the driver circuit Exc1, and/or the measurement transmitter circuit DSP2 is adapted both to process the oscillation measurement signals s43, s44 as well as also to activate the driver circuit Exc2, for example, based on the third and/or fourth oscillation measurement signals to calculate desired values for generating the driver signal e32 and to transmit such to the driver circuit Exc2. Additionally, the driver circuit Exc1 can also be adapted to ascertain amplitude values representing a signal amplitude of the driver signal e31 and to output such to the measurement transmitter circuit DSP1 and/or the driver circuit Exc2 can also be adapted to ascertain amplitude values representing a signal amplitude of the driver signal e32 and to output such to the measurement transmitter circuit DSP2. Moreover, the measurement transmitter circuit DSP1 can, furthermore, also be adapted to transmit also to the measurement transmitter circuit DSP2 desired values for generating the driver signal e31 and/or amplitude values for the signal amplitude of the driver signal e31 received from the driver circuit Exc1 and the measurement transmitter circuit DSP2 can, additionally, be adapted to receive and to process the desired values, or the amplitude values, for example, to include them together with desired values for generating the driver signal e32 and/or together with amplitude values for the signal amplitude of the driver signal e32 in the calculating of the above described viscosity-measured values $X_\eta$. Accordingly, for example, the driver circuit Exc1 can be electrically connected with the measurement transmitter circuit DSP1 and/or the driver circuit Exc2 can be electrically connected with the measurement transmitter circuit DSP2 and/or the measurement transmitter circuit DSP1 can be electrically connected with the measurement transmitter circuit DSP2, for example, via one or more data buses of the measuring- and operating electronics. In an additional embodiment of the invention, it is, furthermore, provided that the driver circuit Exc1 is, however, not electrically connected with the measurement transmitter circuit DSP2 and/or that the driver circuit Exc2 is, however, not electrically connected with the measurement transmitter circuit DSP1. Each of the two measurement transmitter circuits DSP1, DSP2 can, additionally, be formed, for example, in each case, by means of a suitable microprocessor. Accordingly, according to an additional embodiment of the invention, the measurement transmitter circuit DSP1 is formed by means of a first microprocessor μC1 and the measurement transmitter circuit is formed by means of a second microprocessor μC2, for example, also one embodied equally to the microprocessor μC1. In an additional embodiment of the invention, the measurement transmitter circuit DSP2 is, furthermore, also adapted to ascertain using the third and fourth oscillation measurement signals s43, s44 an, especially digital, second portion-mass flow-measured values $X_{m2}$ representing mass flow m2 of the measured substance FL34 flowing through the third and fourth tubes 121, 122, for example, to ascertain the total-flow-measured values $X_m$ using also the second portion-mass flow-measured values $X_{m2}$, for instance, by a repeated summing of an instantaneous second portion-mass flow-measured value with a correspondingly timed, first portion-mass flow-measured value.

As already mentioned, the measuring system of the invention can, furthermore, also be embodied to measure a density of the measured substance. Accordingly, the measurement transmitter circuit DSP1 according to an additional embodiment of the invention is, furthermore, adapted based at least on one of the first and second oscillation measurement signals s41, s42 to ascertain, especially digital, first portion-density-measured values $X_{\rho1}$ representing a density ρ1 of the measured substance FL12 flowing through the first and second tubes 111, 112 and to output such to the measurement transmitter circuit DSP2. The measurement transmitter circuit DSP2 can, in turn, additionally, be adapted to receive from the measurement transmitter circuit DSP1 output first portion-density-measured values $X_{\rho1}$ and based on the first portion-density-measured values $X_{\rho1}$ as well as at least one of the third and fourth oscillation measurement signals s43, s44 to ascertain, especially digital, total-density-measured values $X_\rho$ representing a density ρ, for example, an average density, of the measured substance FL flowing through the tubes 111, 112, 121, 122, or the formed therewith tube arrangement. Alternatively or supplementally, the measurement transmitter circuit DSP2 can, furthermore, also be adapted based at least on one of the third and fourth oscillation measurement signals s43, s44 to ascertain an, especially digital, second portion-density-measured values $X_{\rho2}$ representing density ρ2 of the measured substance FL34 flowing through the third and fourth tubes 121, 122, for example, namely also to receive the first portion-density-measured values $X_{\rho1}$ output by the measurement transmitter circuit DSP1 and based on same time, first and second portion-density-measured values $X_{\rho1}$, $X_{\rho2}$ to ascertain the above described total-density-measured values $X_\rho$.

Figure 7:
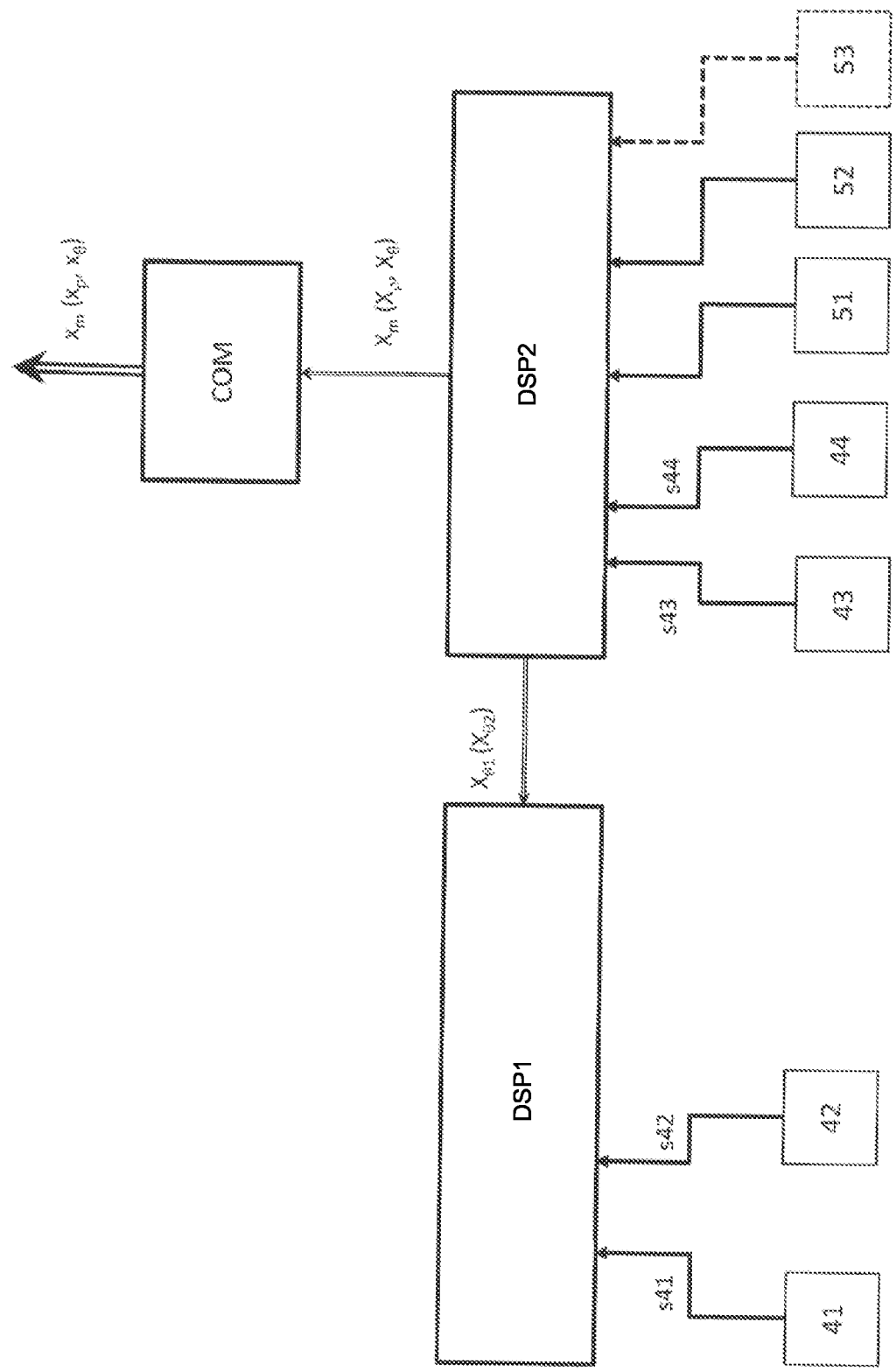
FIG. 7 shows schematically in the manner of a block diagram, another variant of a measuring- and operating electronics suitable for a vibronic measuring system of FIG. 1, 2A, or 2B.

For additional improvement of the accuracy with which the measured values, not least of all also the first and second portion-density-measured values $X_{\rho1}$, $X_{\rho2}$, and the total-density-measured values $X_\rho$, the sensor arrangement includes, as well as also schematically shown in FIG. 3B, according to an additional embodiment of the invention, at least two, for example, also equally constructed and/or spaced from one another, temperature sensors (51, 52, 53), of which a first temperature sensor 51 is connected mechanically with, especially exactly, one of the tubes 111, 112, 121, 122 of the tube arrangement as well as, as also indicated in FIG. 7, electrically, especially only, or exclusively, with the measurement transmitter circuit DSP2, and of which a second temperature sensor 52 is connected mechanically likewise with, especially exactly, one of the tubes 111, 112, 121, 122 as well as, as also indicated in FIG. 7, electrically, especially only, or exclusively, with the measurement transmitter circuit DSP2. Each of the above described temperature sensors 51, 52 is, furthermore, in each case, adapted to register a temperature of the tube mechanically connected therewith and to provide an, especially electrical, first, second temperature measurement signal θ51, θ52 representing temperature. The temperature sensor 51 can be placed, for example, on the tube 111 and the temperature sensor 52 can be placed on another of the tubes, for example, also in such a manner that the temperature sensors 51, 52 are, in each case, positioned with the same separation from the flow divider 21 and/or in its vicinity; the temperature sensors 51, 52 can, as well as also in FIG. 3B shown, however, for example, also be placed, in each case, on the same tube and/or even so positioned that, such as shown in FIG. 3, the temperature sensor 51 is spaced from the flow divider 21 in the same way as the temperature sensor 52 is spaced from the flow divider 22. The measurement transmitter circuit DSP2 is, in turn, furthermore, also adapted to receive from the temperature sensor 51 and to process the first temperature measurement signal θ51, namely to ascertain the, especially digital, first temperature-measured values $X_{\theta1}$ registered with the temperature sensor 51 and representing a temperature dependent thereon. Moreover, the measurement transmitter circuit DSP2 is also adapted to receive and to process the second temperature measurement signal θ52 from the temperature sensor 52, namely to ascertain the, especially digital, second temperature-measured values $X_{\theta 2}$ registered with the temperature sensor 52 and representing a temperature dependent thereon. In an additional embodiment of the invention, the measurement transmitter circuit DSP2 is, additionally, adapted to ascertain, with application of the temperature-measured values $X_{\theta 1}$, $X_{\theta 2}$, the total-mass flow-measured values and/or the total-density-measured values $X_\rho$. Additionally, the measurement transmitter circuit DSP2 can also be adapted to output at least the temperature-measured values $X_{\theta 1}$ and even each of the temperature-measured values $X_{\theta 1}$, $X_{\theta 2}$ to the measurement transmitter circuit DSP1 and the measurement transmitter circuit DSP1 can then correspondingly be adapted to receive and to evaluate temperature-measured values output from the measurement transmitter circuit DSP2, for example, to ascertain the first portion-mass flow-measured values $X_{m1}$ and/or the first portion-density-measured values $X_{\rho 1}$ also using at least the temperature-measured values $X_{\theta 1}$, in given cases, also with application of both the temperature-measured values $X_{\theta 1}$ as well as also the temperature-measured values $X_{\theta 2}$. Moreover, the measurement transmitter circuit DSP2 can, furthermore, be adapted based on the temperature measurement signals θ51, θ52, or the temperature-measured values $X_{\theta 1}$, $X_{\theta 2}$ to ascertain measured substance-temperature-measured values $X_{\theta FL}$ representing temperature of the measured substance FL.

In another embodiment of the invention, the sensor arrangement includes at least a third temperature sensor 53, which, as well as also indicated in FIG. 3B, is connected mechanically with the transducer housing 200 as well as electrically, for example, only, or exclusively, with the measurement transmitter circuit DSP2 and, additionally, is adapted to register a temperature of the transducer housing and to provide an, especially electrical, third temperature measurement signal θ53 representing temperature. The measurement transmitter circuit DSP2 can, as well as also indicated in FIG. 7, furthermore, be adapted to receive and to process the temperature measurement signal θ53 of the temperature sensor 53, namely to ascertain the, especially digital, third temperature-measured values $X_{\theta 3}$ registered with the temperature sensor 53 temperature and representing a temperature dependent thereon. In an additional embodiment of the invention, the measurement transmitter circuit DSP2 is, additionally, adapted to ascertain total-mass flow-measured values and/or total-density-measured values $X_\rho$ and/or measured substance-temperature-measured values $X_{\theta FL}$ also with application of the temperature-measured values $X_{\theta 3}$. Additionally, the measurement transmitter circuit DSP2 can also be adapted to output the temperature-measured values $X_{\theta 3}$ also to the measurement transmitter circuit DSP1 and the measurement transmitter circuit DSP1 can then correspondingly be adapted to receive and to evaluate temperature-measured values $X_{\theta 3}$ output by the measurement transmitter circuit DSP2, for example, to ascertain the first portion-mass flow-measured values $X_{m1}$ and/or the first portion-density-measured values $X_{\rho 1}$ also using at least the temperature-measured values $X_{\theta 3}$.

As evident from FIG. 6, there is provided in the measuring- and operating electronics ME, especially electrically connected with the measurement transmitter circuit DSP2, according to an additional embodiment of the invention, furthermore, also an interface circuit COM serving for output ($x_m$) of measured values, for example, digital measured values and/or measured values ascertained by means of the measurement transmitter circuit DSP2, for example, measured values in the form of total mass flow-measured values $X_m$. Accordingly, the measurement transmitter circuit DSP2 is according to an additional embodiment of the invention, furthermore, adapted to output therewith ascertained total-flow-measured values $X_m$ to the interface circuit COM and the interface circuit is, additionally, adapted to receive total-mass flow-measured values $X_m$ output by the measurement transmitter circuit DSP2 and to convert such into a mass flow-output signal $x_m$ providing the total-mass flow-measured values $X_m$, for example, in conformance with an industrial standard, for example, DIN IEC 60381-1:1985-11, IEC 61784-1 CPF1 (Foundation Fieldbus), IEC 61784-1 CPF3 (Profibus), IEC 61158 or IEC 61784-1 CPF9 (HART). The interface circuit COM can be electrically connected therefor, for example, also with the measurement transmitter circuit DSP2, equally as well, not with the measurement transmitter circuit DSP1. Moreover, the the measurement transmitter circuit DSP2 can also be adapted to output the total-density-measured values $X_\rho$ and/or the measured substance-temperature-measured values $X_{\theta FL}$ to the interface circuit COM and the interface circuit COM can, accordingly also, furthermore, be adapted to convert such into a density-output signal $x_\rho$, or temperature-output signal $x_\theta$, as the case may be, providing the total-density-measured values $X_\rho$, or the measured substance-temperature-measured values $X_{\theta FL}$, for example, in conformance with one of the above described industry standards.

The measuring- and operating electronics ME can, as well as also indicated in each case in FIGS. 1, 2A and 2B, furthermore, be provided in an, especially explosion-, or pressure resistant and/or protecting the measuring- and operating electronics ME at least against water spray, electronics-protective housing 100; this, especially, in such a manner that both the driver circuits Exc1, Exc2 as well as also the measurement transmitter circuits DSP1, DSP2, especially also the above-mentioned interface circuit COM, are located in the electronics-protective housing 100.

The invention claimed is:

1. A vibronic measuring system for measuring and monitoring a flow parameter changeable as a function of time and a substance parameter changeable as a function of time, the vibronic measuring system comprising:
a measuring transducer having:
a tube arrangement to convey a flowing fluid, wherein the tube arrangement includes:
a first flow divider serving as a line branching and having exactly four flow openings,
a second flow divider embodied equally to the first flow divider and serving as a line junction and having exactly four flow openings,
an at least sectionally bent first tube,
a second tube constructed equally to the first tube,
an at least sectionally bent third tube, and
a fourth tube constructed equally to the third tube,
wherein each of the first, second, third, and fourth tubes of the tube arrangement extends with a tube length, in each case, from a first end of the tube to a second end of the tube and includes, in each case, a lumen surrounded by a metal tube wall, and extending, in each case, from the first end of the tube to the second end of the tube,
wherein each of the first, second, third, and fourth tubes of the tube arrangement is, in each case, connected to each of the first and second flow dividers, in such a manner that:

the first tube communicates with its first end with a first flow opening of the first flow divider and with its second end with a first flow opening of the second flow divider, the second tube communicates with its first end with a second flow opening of the first flow divider and with its second end with a second flow opening of the second flow divider, the third tube communicates with its first end with a third flow opening of the first flow divider and with its second end with a third flow opening of the second flow divider, and the fourth tube communicates with its first end with a fourth flow opening of the first flow divider and with its second end with a fourth flow opening of the second flow divider, and wherein each of the first, second, third, and fourth tubes of the tube arrangement is, in each case, adapted to be flowed through by the flowing liquid and during that to be caused to vibrate;

an exciter arrangement for converting electrical power into mechanical power serving for exciting and maintaining forced mechanical oscillations of the tube arrangement, wherein the exciter arrangement includes two electrodynamic and/or equally constructed oscillation exciters of which:

a first oscillation exciter is connected mechanically with both the first tube as well as also the second tube, and a second oscillation exciter is connected mechanically with both with the third tube as well as also the fourth tube, wherein each of the first and second oscillation exciters is, in each case, adapted to convert electrical power into mechanical power; and a sensor arrangement for registering mechanical oscillations of the tube arrangement and for providing, in each case, oscillation measurement signals representing oscillatory movements of the tube arrangement, wherein the sensor arrangement includes four electrodynamic and/or equally constructed and/or mutually spaced from one another oscillation sensors of which:

a first oscillation sensor and a second oscillation sensor are, in each case, mechanically connected with both the first tube as well as also the second tube, and a third oscillation sensor and a fourth oscillation sensor are, in each case, mechanically connected with both the third tube as well as also the fourth tube, wherein each of the first, second, third, and fourth oscillation sensors is, in each case, adapted to register oscillatory movements of the first, second, third, or fourth tubes mechanically connected therewith and to provide first, second, third, or fourth oscillation measurement signals representing first the oscillatory movements; and a measuring- and operating electronics electrically coupled with the measuring transducer via electrical connection lines and having:

a first driver circuit adapted to generate an electrical, first driver signal and therewith to supply electrical power to the first oscillation exciter in such a manner that the first and second tubes execute, at least partially, wanted oscillations that are opposite-equal, forced mechanical oscillations having at least a first wanted frequency that is an oscillation frequency predetermined by the first driver signal and corresponding to a first resonant frequency of the tube arrangement, oscillations which are suitable to bring about in the measured substance flowing through the first and second tubes, in each case, Coriolis forces dependent on the mass flow;

a second driver circuit adapted to generate an electrical, second driver signal and therewith to supply electrical power to the second oscillation exciter in such a manner that the third and fourth tubes execute, at least partially, wanted oscillations that are opposite-equal, forced mechanical oscillations having at least a second wanted frequency that is an oscillation frequency predetermined by the second driver signal and the corresponding to a second resonant frequency of the tube arrangement, oscillations which are suitable to bring about in the measured substance flowing through the third and fourth tubes, in each case, Coriolis forces dependent on the mass flow;

a first measurement transmitter circuit adapted to receive and to process both the first oscillation measurement signal of the first oscillation sensor and the second oscillation measurement signal of the second oscillation sensor and to ascertain a first portion mass flow measured values representing mass flow of the flowing fluid flowing through the first and second tubes and to output the first portion mass flow measured values to a second measurement transmitter circuit, wherein the first measurement transmitter circuit is further adapted for activating the first driver circuit; and a second measurement transmitter circuit adapted to receive and to process the third oscillation measurement signal of the third oscillation sensor, the fourth oscillation measurement signal of the fourth oscillation sensor, and the first portion mass flow measured values output by the first measurement transmitter circuit and to ascertain total flow measured values representing a total mass flow of the measured substance flowing through the first, second, third, and fourth tubes, wherein the second measurement transmitter circuit is further adapted for activating the second driver circuit.

2. The vibronic measuring system as claimed in claim 1, wherein the first driver circuit is connected electrically with the first measurement transmitter circuit, but not with the second measurement transmitter circuit; and/or wherein the second driver circuit is connected electrically with the second measurement transmitter circuit, but not with the first measurement transmitter circuit; and/or wherein the first measurement transmitter circuit and the second measurement transmitter circuit are electrically connected with one another.

3. The vibronic measuring system as claimed in claim 1, wherein the first measurement transmitter circuit is formed by a first microprocessor.

4. The vibronic measuring system as claimed in claim 3, wherein the second measurement transmitter circuit is formed by a second microprocessor.

5. The vibronic measuring system as claimed in claim 1, wherein the second measurement transmitter circuit is adapted using the third and fourth oscillation measurement signals to ascertain second portion-mass flow-measured values representing a mass flow of the measured substance flowing through the third and fourth tubes.

6. The vibronic measuring system as claimed in claim 5, wherein the second measurement transmitter circuit is adapted to ascertain total-flow-measured values using also second portion-mass flow-measured values.

7. The vibronic measuring system as claimed in claim 1, wherein the sensor arrangement has at least two temperature sensors constructed equally to and/or spaced from one another, of which:
- a first temperature sensor is connected mechanically with one of the first, second, third, and fourth tubes and electrically connected with the second measurement transmitter circuit, and
- a second temperature sensor is connected mechanically with one of the first, second, third, and fourth tubes and electrically connected with the second measurement transmitter circuit,
- wherein each of the first and second temperature sensors is, in each case, adapted to register a temperature of the first, second, third, or fourth tube mechanically connected therewith and to provide a first, or second electrical, temperature measurement signal representing the temperature.

8. The vibronic measuring system as claimed in claim 7, wherein the second measurement transmitter circuit is adapted to receive and to process the first temperature measurement signal from the first temperature sensor and to ascertain first temperature-measured values representing temperature registered the with the first temperature sensor or a temperature dependent thereon.

9. The vibronic measuring system as claimed in claim 8, wherein the second measurement transmitter circuit is adapted to receive and to process the second temperature measurement signal from the second temperature sensor and to ascertain second temperature-measured values representing the temperature registered with the second temperature sensor or a temperature dependent therefrom.

10. The vibronic measuring system as claimed in claim 9, wherein the second measurement transmitter circuit is adapted to ascertain total-mass flow-measured values also with application of the first and second temperature-measured values.

11. The vibronic measuring system as claimed in claim 10,
- wherein the second measurement transmitter circuit is adapted to output at least the first temperature-measured values to the first measurement transmitter circuit, and
- wherein the first measurement transmitter circuit is adapted to receive and to evaluate temperature-measured values output from the first measurement transmitter circuit, and to ascertain the first portion-mass flow-measured values and/or the first portion-density-measured values also using at least the first temperature-measured values.

12. The vibronic measuring system as claimed in claim 1, further comprising:
- a transducer housing jacketing the first, second, third, and fourth tubes, wherein the transducer housing has at least a hermetically sealed cavity and wherein each of the first, second, third, and fourth tubes is arranged within the cavity.

13. The vibronic Measuring system as claimed in claim 12,
- wherein the sensor arrangement has at least a third temperature sensor,
- wherein the third temperature sensor is connected mechanically with the transducer housing as well as electrically with the second measurement transmitter circuit and is adapted to register a temperature of the transducer housing and to provide an electrical, third temperature measurement signal representing the temperature.

14. The measuring system as claimed in claim 13, wherein the second measurement transmitter circuit is adapted to receive and to process the third temperature measurement signal of the third temperature sensor and to ascertain third temperature-measured values representing the temperature registered with the third temperature sensor or a temperature dependent thereon.

15. The vibronic measuring system as claimed in claim 14, wherein the second measurement transmitter circuit is adapted to ascertain total-mass flow-measured values also using the third temperature-measured values.

16. The vibronic measuring system as claimed in claim 15,
- wherein the second measurement transmitter circuit is adapted to output the third temperature-measured values to the first measurement transmitter circuit, and
- wherein the first measurement transmitter circuit is adapted to receive and to evaluate the third temperature-measured values and to ascertain the first mass flow-measured values also using the third temperature-measured values.

17. The vibronic measuring system as claimed in claim 12, further comprising:
- an explosion, or pressure resistant, electronics-protective housing.

18. The vibronic measuring system as claimed in claim 17, wherein both the first and second driver circuits as well as also the first and second measurement transmitter circuits are accommodated in the electronics-protective housing and protected against water spray.

19. The vibronic measuring system as claimed in claim 18, wherein the measuring- and operating electronics further comprises:
- an interface circuit for outputting measured values, including digital measured values and/or measured values ascertained by means of the second measurement transmitter circuit.

20. The vibronic measuring system as claimed in claim 19, wherein the interface circuit is accommodated in the electronics-protective housing.

21. The vibronic measuring system as claimed in claim 20,
- wherein the interface circuit is electrically connected with the second measurement transmitter circuit but not with the first measurement transmitter circuit; and/or
- wherein the second measurement transmitter circuit is adapted to output to the interface circuit total-flow-measured values ascertained therewith, and
- wherein the interface circuit is adapted to receive total-mass flow-measured values output from the second measurement transmitter circuit and to convert them into a mass flow-output signal providing the total-mass flow-measured values conforming to an industrial standard.

22. The vibronic measuring system as claimed in claim 1, wherein the first measurement transmitter circuit is adapted based at least on one of the first and second oscillation measurement signals to ascertain first portion-density-measured values representing a density of the measured substance flowing through the first and second tubes and to output such to the second measurement transmitter circuit.

23. The vibronic measuring system as claimed in claim 22, wherein the second measurement transmitter circuit is adapted to receive first portion-density-measured values output from the first measurement transmitter circuit and based on first portion-density-measured values as well as at least one of the third and fourth oscillation measurement signals to ascertain total-density-measured values representing a density of the measured substance flowing through the first, second, third, and fourth tubes.

24. The vibronic measuring system as claimed in claim 22, wherein the second measurement transmitter circuit is adapted based at least on one of the third and fourth oscillation measurement signals to ascertain second portion-density-measured values representing a density of the measured substance flowing through the third and fourth tubes.

25. The vibronic measuring system as claimed in claim 24, wherein the second measurement transmitter circuit is adapted to receive first portion-density-measured values output from the first measurement transmitter circuit and based on first and second portion-density-measured values to ascertain total-density-measured values representing an average density of the measured substance flowing through the first, second, third, and fourth tubes.

* * * * *